(12) United States Patent
Mizusawa

(10) Patent No.: US 10,314,010 B2
(45) Date of Patent: Jun. 4, 2019

(54) APPARATUS FOR RADIO COMMUNICATION SYSTEMS

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 32 days.

(21) Appl. No.: 15/500,808

(22) PCT Filed: Jul. 21, 2015

(86) PCT No.: PCT/JP2015/070648
§ 371 (c)(1),
(2) Date: Jan. 31, 2017

(87) PCT Pub. No.: WO2016/039017
PCT Pub. Date: Mar. 17, 2016

(65) Prior Publication Data
US 2017/0223663 A1     Aug. 3, 2017

(30) Foreign Application Priority Data
Sep. 12, 2014   (JP) ................................. 2014-186533

(51) Int. Cl.
*H04W 72/00* (2009.01)
*H04W 4/06* (2009.01)
*H04W 16/14* (2009.01)
(Continued)

(52) U.S. Cl.
CPC ....... *H04W 72/005* (2013.01); *H04L 29/0619* (2013.01); *H04L 29/08954* (2013.01);
(Continued)

(58) Field of Classification Search
CPC ............ H04W 72/005; H04W 72/1236; H04L 29/0619; H04L 65/80; H04L 29/08954; H04L 65/4076
See application file for complete search history.

(56) References Cited

U.S. PATENT DOCUMENTS

2011/0116487 A1   5/2011  Grandhi
2012/0287838 A1*  11/2012 Zhang ................... H04W 76/40
                                                              370/312
(Continued)

FOREIGN PATENT DOCUMENTS

JP    2013-511217     3/2013
JP    2013-511217 A   3/2013

OTHER PUBLICATIONS

3GPP TS 36.443v113.0, Jun. 2013, 3GPP TS E-ETRAN—M2 Application Protocol.*
(Continued)

*Primary Examiner* — Lakeram Jangbahadur
(74) *Attorney, Agent, or Firm* — Xsensus LLP

(57) ABSTRACT

[Object] To enable provision of a service of MBSFN using frequency bands shared by a plurality of radio communication systems.
[Solution] There is provided an apparatus, including: a first control unit configured to acquire scheduling information for MBSFN transmission in a frequency band shared by a plurality of radio communication systems and provide the scheduling information to two or more base stations belonging to an MBSFN area for the MBSFN transmission.

16 Claims, 23 Drawing Sheets

(51) Int. Cl.

| | | |
|---|---|---|
| *H04W 72/04* | (2009.01) | |
| *H04L 29/06* | (2006.01) | |
| *H04L 29/08* | (2006.01) | |
| *H04W 72/12* | (2009.01) | |

(52) U.S. Cl.
CPC ......... *H04L 65/4076* (2013.01); *H04L 65/80* (2013.01); *H04W 4/06* (2013.01); *H04W 16/14* (2013.01); *H04W 72/04* (2013.01); *H04W 72/1236* (2013.01)

(56) References Cited

U.S. PATENT DOCUMENTS

| | | | | |
|---|---|---|---|---|
| 2013/0163500 | A1* | 6/2013 | Na | H04W 72/005 370/312 |
| 2015/0358940 | A1* | 12/2015 | Zhang | H04W 4/06 370/312 |
| 2015/0365963 | A1* | 12/2015 | Won | H04W 28/0268 370/329 |
| 2017/0013422 | A1* | 1/2017 | Saiwai | H04W 4/06 |
| 2017/0181062 | A1* | 6/2017 | Kim | H04W 48/10 |

OTHER PUBLICATIONS

"LTE: Evolved Universal Terrestrial Radio Access (E-UTRA); Radio Resource Control (RRC): Protocol specification (3GPP TS 36.331 version 11.5.0 Release 11)", ETSI TS 136 331, V11.5.0, Total 351 Pages, (Sep. 2013).

"Considerations on meeting public-safety group-communication requirements with LTE MBMS", NSN, 3GPP TSG-RAN WG2 Meeting #84, R2-134346, Total 4 Pages. (Nov. 11-15, 2013).

"$e^{rd}$ Generation Partnership Project; Technical Specification Group Radio Access Network; Evolved Universal Terrestrial Radio Access Network (E-UTRAN); M2 Application Protocol (M2AP) (Release 11)", 3GPP TS 36.443, V11.3.0, Total 3 Pages. (Jun. 2013).

"Solutions for required functionalities and design targets", QUALCOMM Incorporated, 3GPP TSG RAN WG1 #78BIS, Agenda Item: 7.3.2.3, R1-144000. Total 5 Pages, (Oct. 6-10, 2014).

International Search Report dated Oct. 20, 2015 in PCT/JP15/070648 filed Jul. 21, 2015.

Extended European Search Report dated Mar. 2, 2018 in European Patent Application No. 15840159.6.

* cited by examiner

FIG.5
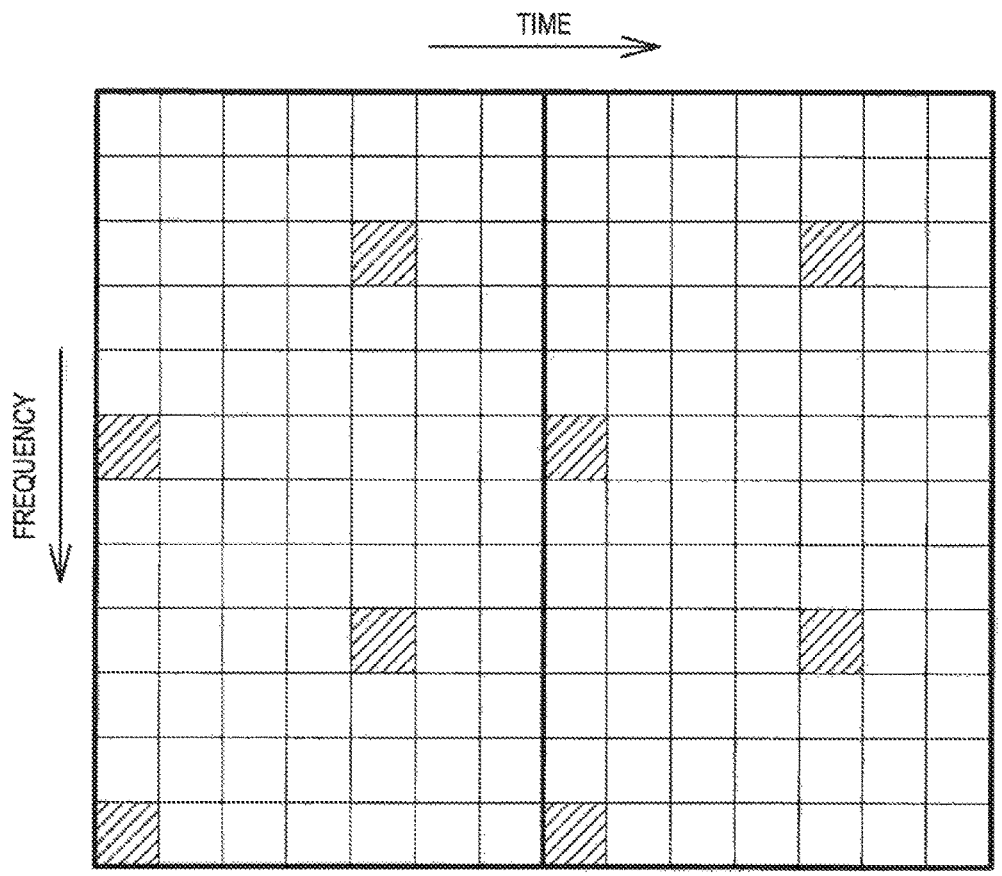
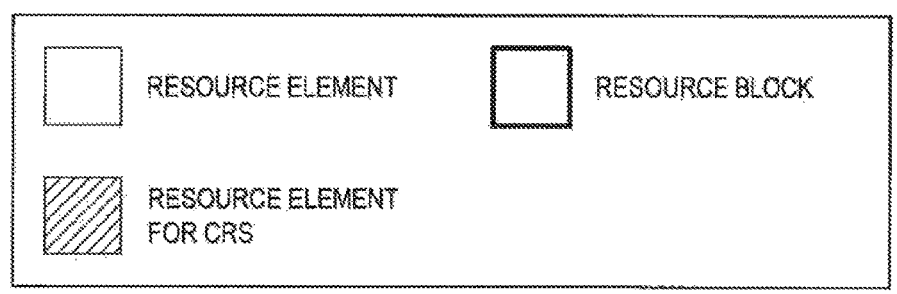

FIG.8
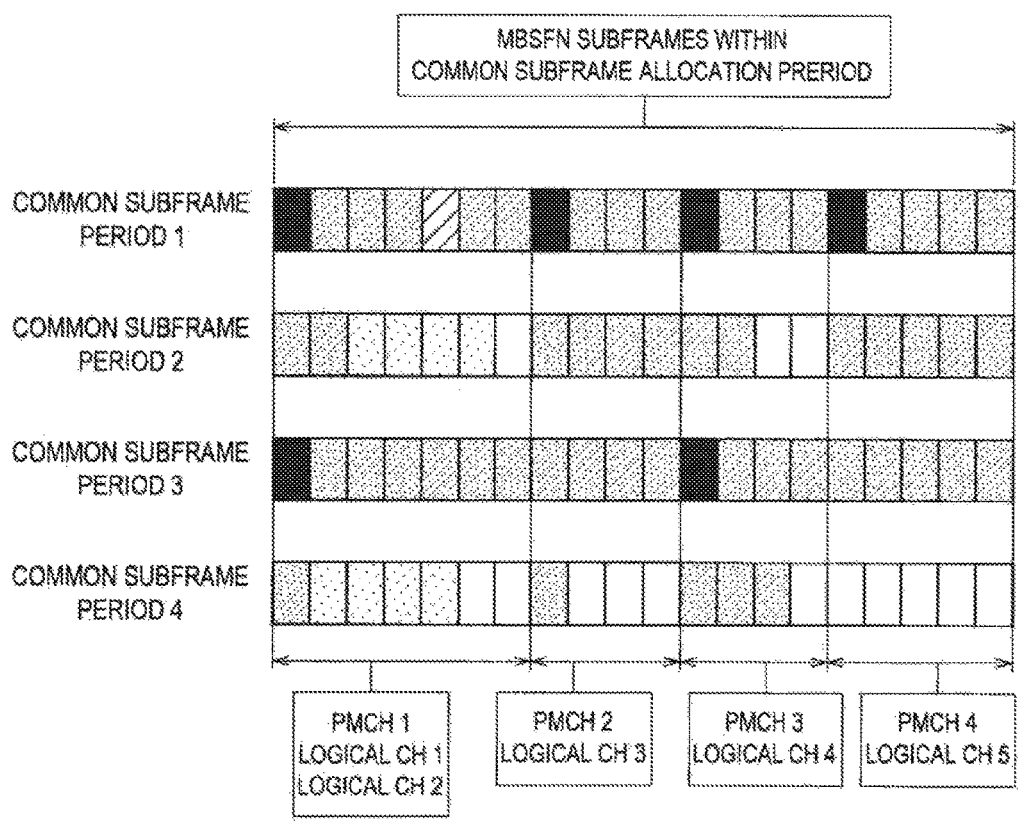
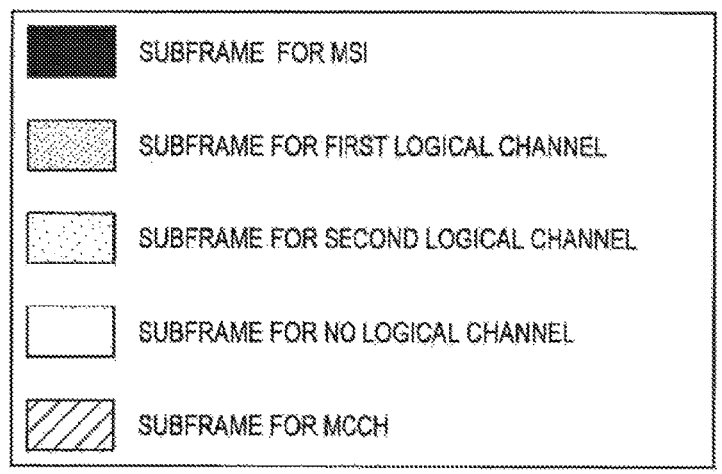

APPARATUS FOR RADIO COMMUNICATION SYSTEMS

TECHNICAL FIELD

The present disclosure relates to an apparatus.

BACKGROUND ART

In cellular networks, multicast broadcast multimedia services (MBMS) has been put to practical use as a scheme of delivering the same content as broadcast content to a plurality of users. In particular, in Long Term Evolution (LTE), an MBMS over single frequency network (MBSFN) in which base stations of a plurality of cells are mutually synchronized to deliver the same content has been standardized. Through an MBSFN, received signals from a plurality of base stations are combined in a terminal so that reception quality can be improved. Moreover, in order to cope with recent increases in traffic, a more efficient operation of MBSFN is being anticipated.

For example, Non-Patent Literature 1 discloses a technology standardized for MBMS and MBSFN.

CITATION LIST

Non-Patent literature

Non-Patent Literature 1: 3GPP TS 36.331 V11. 5.0 (2013-09) LTE; Evolved Universal Terrestrial Radio Access (E-UTRA); Radio Resource Control (RRC); Protocol Specification

DISCLOSURE OF INVENTION

Technical Problem

Due to the rapid increases in traffic in cellular systems, there are growing concerns about the exhaustion of frequency bands. For this reason, the use of unlicensed bands in cellular systems is under review. For example, the unlicensed bands include a 5 GHz band and a 60 GHz band used in a wireless local area network (LAN), and the like. As an example, some frequency bands of the 5 GHz band (for example, channels of a wireless LAN) are assumed to be used as downlink component carriers for small cells in a cellular system. In a case where a frequency band included in an unlicensed band is used in a cellular system, the frequency band can be regarded to be a frequency band shared by a plurality of radio communication systems.

However, if each base station of s cellular system uses a frequency band included in an unlicensed band independently, it is difficult to perform MBSFN transmission in the frequency band. In other words, it is difficult to provide a service of MBSFN using the frequency band.

In this regard, it is desirable to provide a mechanism enabling provision of a service of MBSFN using frequency bands shared by a plurality of radio communication systems.

Solution to Problem

According to the present disclosure, there is provided an apparatus, including: a first control unit configured to acquire scheduling information for MBSFN transmission in a frequency band shared by a plurality of radio communication systems and provide the scheduling information to two or more base stations belonging to an MBSFN area for the MBSFN transmission.

Further, according to the present disclosure, there is provided an apparatus, including: a first control unit configured to request a control entity to allocate an MBSFN area to a base station; and a second control unit configured to acquire scheduling information which is scheduling information for MBSFN transmission in a frequency band shared by a plurality of radio communication systems and provided from the control entity to the base station and control the MBSFN transmission in the frequency band by the base station in accordance with the scheduling information.

Advantageous Effects of Invention

As described above, according to the present disclosure, it is possible to provide a service of MBSFN using frequency bands shared by a plurality of radio communication systems. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 5 is an explanatory diagram illustrating an example of a CRS transmitted in the normal subframes.

FIG. 8 an explanatory diagram illustrating examples of a PMCH and an MTCH mapped to the PMCH.

MODE(S) FOR CARRYING OUT THE INVENTION

Figure 1:
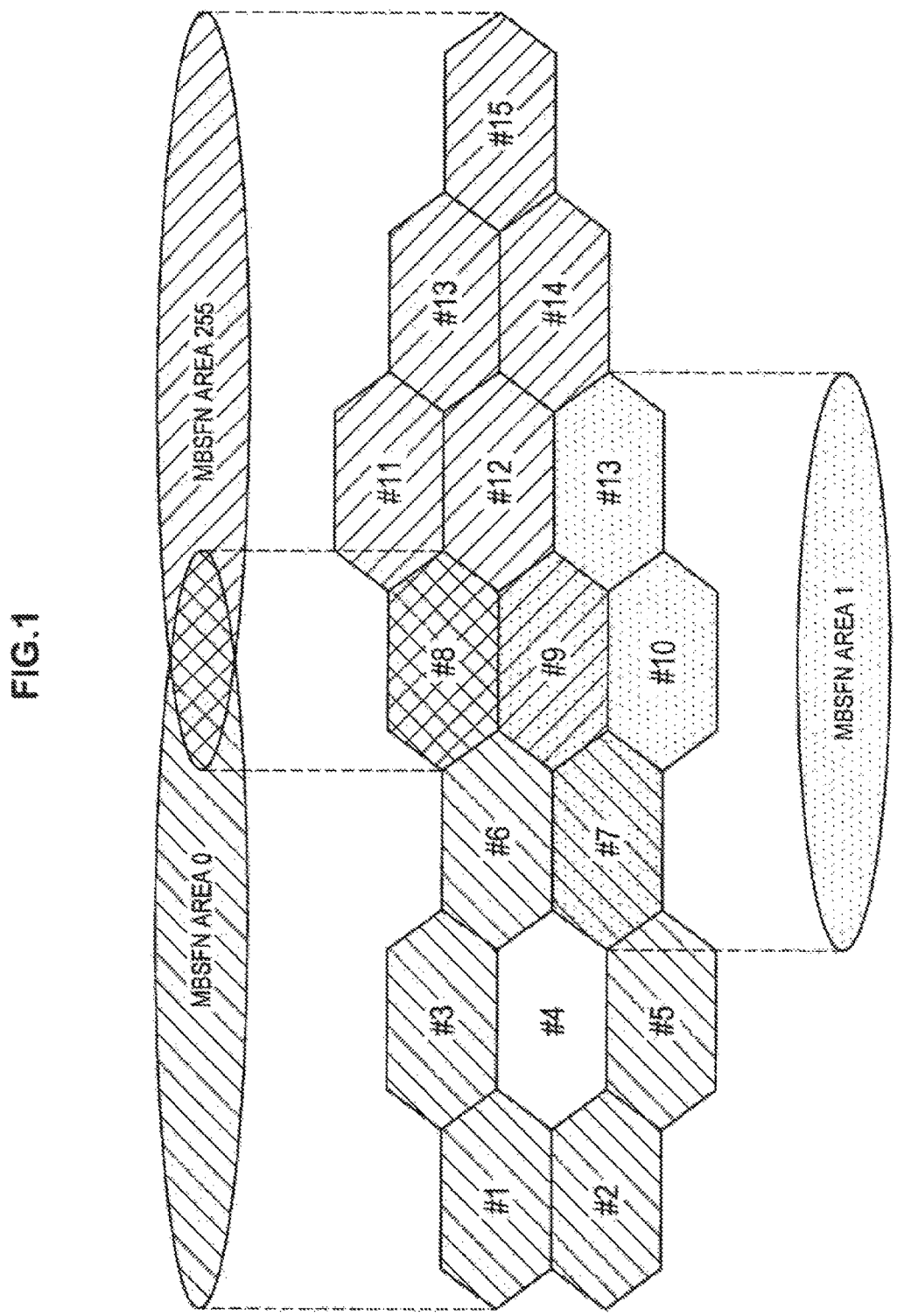
FIG. 1 is an explanatory diagram illustrating an example of an MBSFN area.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this specification and the appended drawings, different letters may be added to the end of structural elements having substantially the same function to distinguish them. For example, a plurality of structural elements having substantially the same functional configuration are distinguished as necessary as in a base station 200A and a base station 200B. However, in a case where it is unnecessary to particularly distinguish a plurality of structural elements having substantially the same functional configuration, only the same reference numeral is given. For example, in a case where the base station 200A and the base station 200B need not be particularly distinguished, they are referred to simply as a "base station 200"

The description will proceed in the following order.
1. Introduction
2. Schematic configuration of system
3. Configurations of apparatuses
3.1. Configurations of control entity
3.2. Configurations of base station
4. First embodiment
4.1. Overview
4.2. Technical characteristics of first embodiment
4.3. Flow of process
5. Second embodiment
5.1. Overview
5.2. Technical characteristics of second embodiment
5.3. Flow of process
6. Application examples
6.1. Application example regarding control entity
6.2. Application examples regarding base station
7. Conclusion «1. Introduction»

First, technologies for an MBSFN will be described with reference to FIGS. 1 to 9.

(1) MBSFN Area

In an MBSFN, a plurality of base stations are mutually synchronized to deliver the same content. That is, in an MBSFN, a plurality of base stations transmit the same data with the same radio resources. Cells (that is, a plurality of cells) of the plurality of base stations are referred to as MBSFN areas. Bach cell can belong to a maximum of 8 MBSFN areas. Hereinafter, a specific example of an MBSFN area will be described with reference to FIG. 1.

FIG. 1 is an explanatory diagram illustrating an example of an MBSFN area. Referring to FIG. 1, cells #1 to #15 are illustrated. In this example, an MBSFN area 0 includes cells #1 to #3 and #5 to #8, an MBSFN area 1 includes cells #7, #9, #10, and #13, and an MBSFN area 255 includes cells #8, #9, and #11 to #15. Cell #7 belongs to both of the MBSFN area 0 and the MBSFN area 1. Cell #8 belongs to both of the MBSFN area 0 and the MBSFN area 255. Cell #9 belongs to both of the MBSFN area 1 and the MBSFN area 255. Cell #4 belongs to neither the MBSFN area 1 nor the MBSFN area.

(2) Channels Related to MBMS

Logical channels, transport channels, and physical channels are decided for an MBMS. Hereinafter, this point will be described with reference to FIG. 2.

Figure 2:
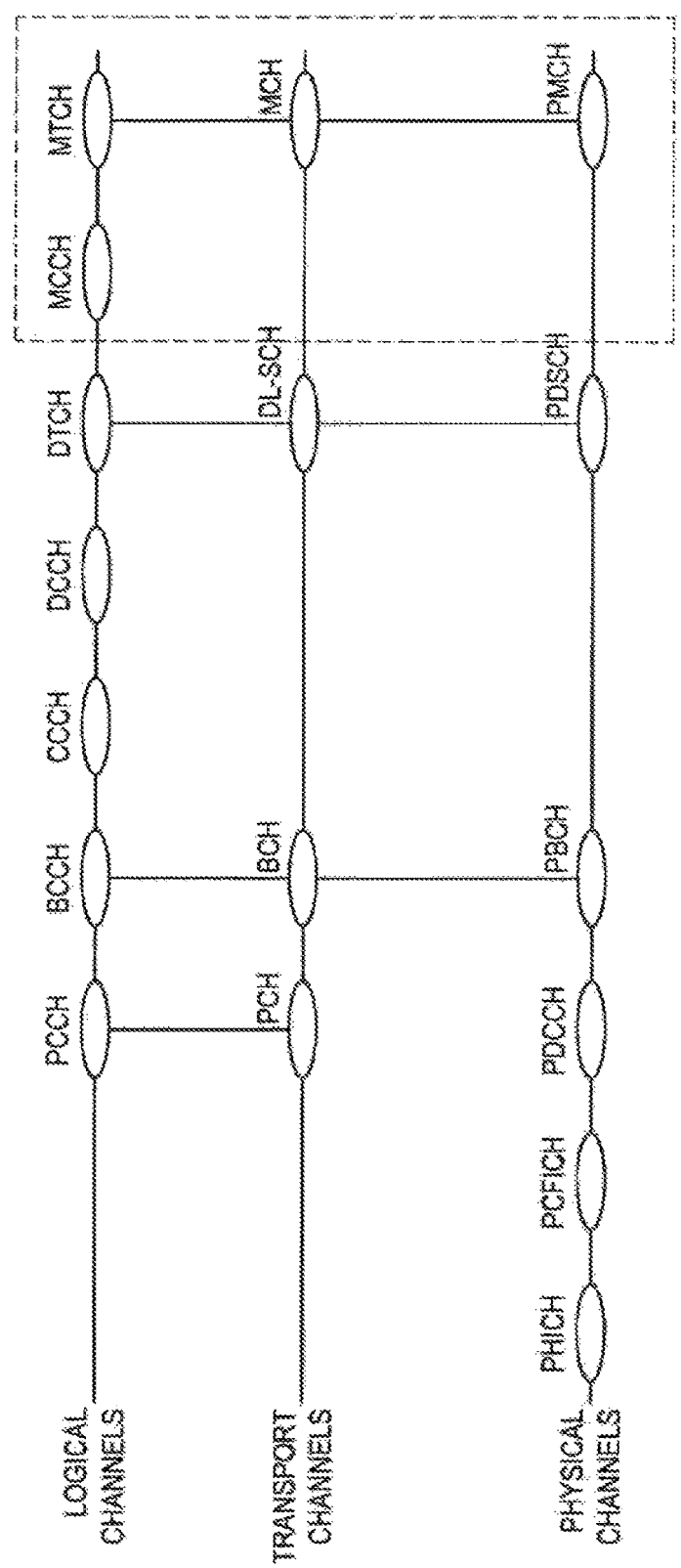
FIG. 2 is an explanatory diagram illustrating channels for an MBMS.

FIG. 2 is an explanatory diagram illustrating channels for the MBMS. Referring to FIG. 2, logical channels, transport channels, and physical channels decided in LTE are illustrated. In particular, a multicast control channel (MCCH) and a multicast traffic channel (MTCH) are decided as the logical channels for the MBMS. The MCCH is a channel for transmitting control information such as an MBSFN area configuration message and an MBM counting request message (MBMS). The MTCH is a channel for transmitting data of the MBMS. A physical multicast channel (PMCH) is decided as the physical channel for the MBMS. Both of the control in formation mapped to the MCCH and data mapped to the MTCH are mapped to the PMCH via a multicast channel (MCH) which is a transport channel.

(3) MBSFN Subframes

The MBSFN is transmitted with MBSFN subframes. The MBSFN subframe is indicated by a radio frame allocation period, a radio frame allocation offset, and a subframe allocation. Hereinafter, specific examples of the MBSFN subframes will be described with reference to FIG. 3.

Figure 3:
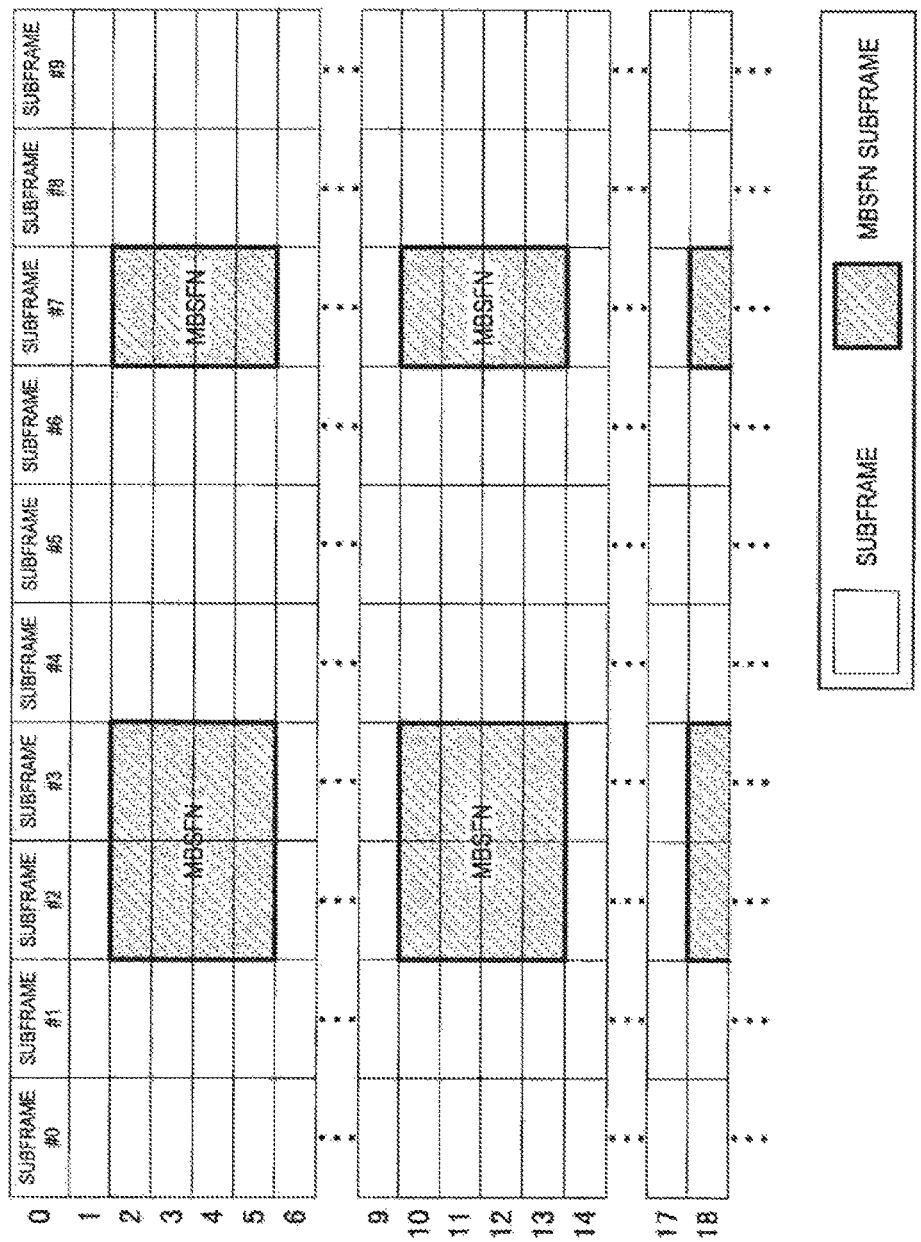
FIG. 3 is an explanatory diagram illustrating examples of MBSFN subframes.

FIG. 3 is an explanatory diagram illustrating examples of the MBSFN subframes. Referring to FIG. 3, subframes included in a radio frame of each system frame number (SFN) are illustrated. In this example, the radio frame allocation period is 8 and the radio frame allocation offset is 2. The subframe allocation is a 4 frame patient (24 bits). Therefore, a radio frame of the SFN satisfying "SFN mod 8=2" (that is, the SFN of 2, 10, 18, or the like) and 3 radio frames continuously subsequent to the radio frame are radio frames for the MBSFN. In this example, frequency division duplexing (FDD) is adopted and the subframe allocation is "011010 011010 011010 011010." In a case where the FDD is adopted, bits of the subframe allocation indicate subframes #1, #2, #3, #6, #7, and #8. Therefore, of the radio frames, subframes #2, #3, and #7 are MBSFN subframes.

Subframes with which system information and paging information are transmitted are not used as the MBSFN subframes. Thus, in a case whew the FDD is adopted, subframes #0, #4, #5, and #9 are not used as the MBSFN subframes. In a case where time division duplexing (TDD) is adopted, subframes #0, #1, #2, #5, and #6 are not used as the MBSFN subframes.

For example, a terminal apparatus is notified of the MBSFN subframes with a system information block (SIB) 2. Accordingly, the terminal apparatus can know the MBSFN area. The terminal apparatus is notified of the MBSFN subframes of each MBSFN area also with control information mapped to the MCCH (MBSFN area configuration message), as will be described below.

(4) Reference Signal

The MBSFN subframe includes an MBSFN region and a non-MBSFN region. Since the PMCH is arranged in the MBSFN region, and control information mapped to the MCCH and data mapped to the MTCH are transmitted specifically in the MBSFN region.

The base stations of the cells belonging to the MBSFN area transmit the same signal particularly in the MBSFN regions of the MBSFN sub frames. Therefore, these base stations do not transmit a cell-specific reference signal (CRS) in the MBSFN region. Instead, these base stations transmit an MBSFN reference signal (MBSFN-RS) which is a reference signal for the MBSFN. The MBSFN-RS is transmitted with the same radio resources (that is, the same resource elements) in all the cells belonging to the MBSFN area. This point will be described below with reference to FIG. 4 using a specific example.

Figure 4:
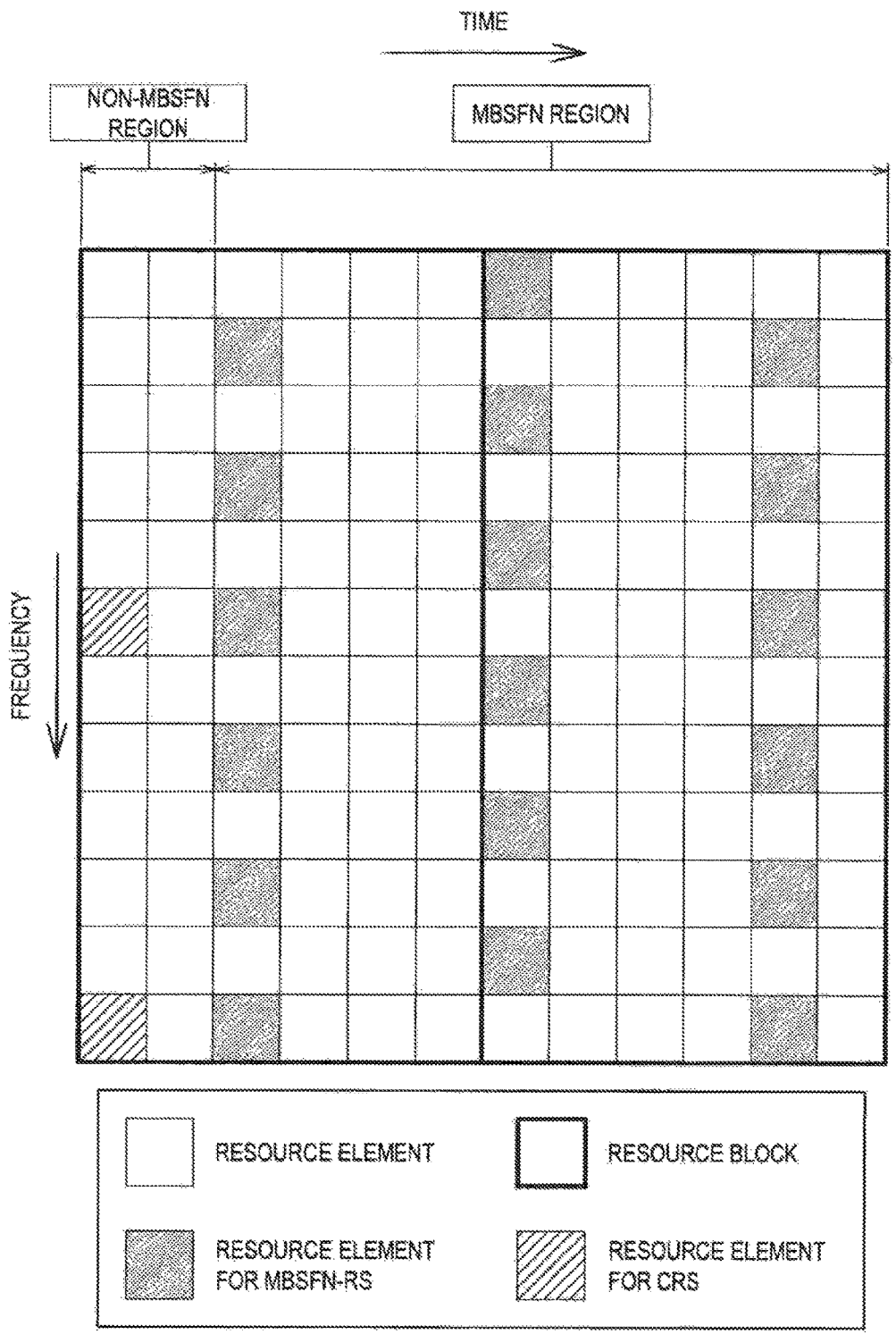
FIG. 4 is an explanatory diagram for describing an example of a signal transmitted in an MBSFN subframe.

FIG. 4 is tin explanatory diagram illustrating an example of signals transmitted in the MBSFN subframes. Referring to FIG. 4, two resource blocks (RB) arranged in a time direction in the MBSFN subframes are illustrated. In this example, the MBSFN subframes include 12 OFDM symbols in the time direction. The MBSFN subframe includes a non-MBSFN region extending over the first two OFDM symbols among the 12 OFDM symbols and an MBSFN region continuing after the non-MBSFN region. In the non-MBSFN region, the CRS can be transmitted. On the other hand, in the MBSFN region, a common MBSFN-RS between cells belonging to the MBSFN area is transmitted. In the MBSFN region, the control information mapped to the MCCH and/or the data mapped to the MTCH are transmitted.

The CRS is transmitted in subframes other than the MBSFN subframes. The CRS is used for cell selection, channel estimation, and synchronous detection, and the like. A specific example of the CRS will be described below with reference to FIG. 5.

FIG. 5 is an explanatory diagram illustrating an example of the CRS transmitted in the normal subframes. Referring to FIG. 5, two resource blocks (RBs) arranged in the time direction in the normal subframes are illustrated. The normal subframes include 14 OFDM symbols in the time direction. The CRS is transmitted with a predetermined resource element (RE) in each RB. The predetermined RE is set for each cell.

(5) MCCH, MTCH, and PMCH (a) Relation between MBSFN Area and MCCH

One MCCH corresponds to one MBSFN area. That is, the MCCH is present in each MBSFN area to which the cell belongs.

(b) SIB 13

An SIB 13 indicates a subframe or the like in which the MCCH is disposed and the terminal apparatus is notified of the SIB 13. More specifically, the SIB 13 includes an MCCH repetition period, an MCCH offset, subframe allocation information, and the like. Hereinafter, specific examples of the subframes in which the MCCH is disposed will be described with reference to FIG. 6.

Figure 6:
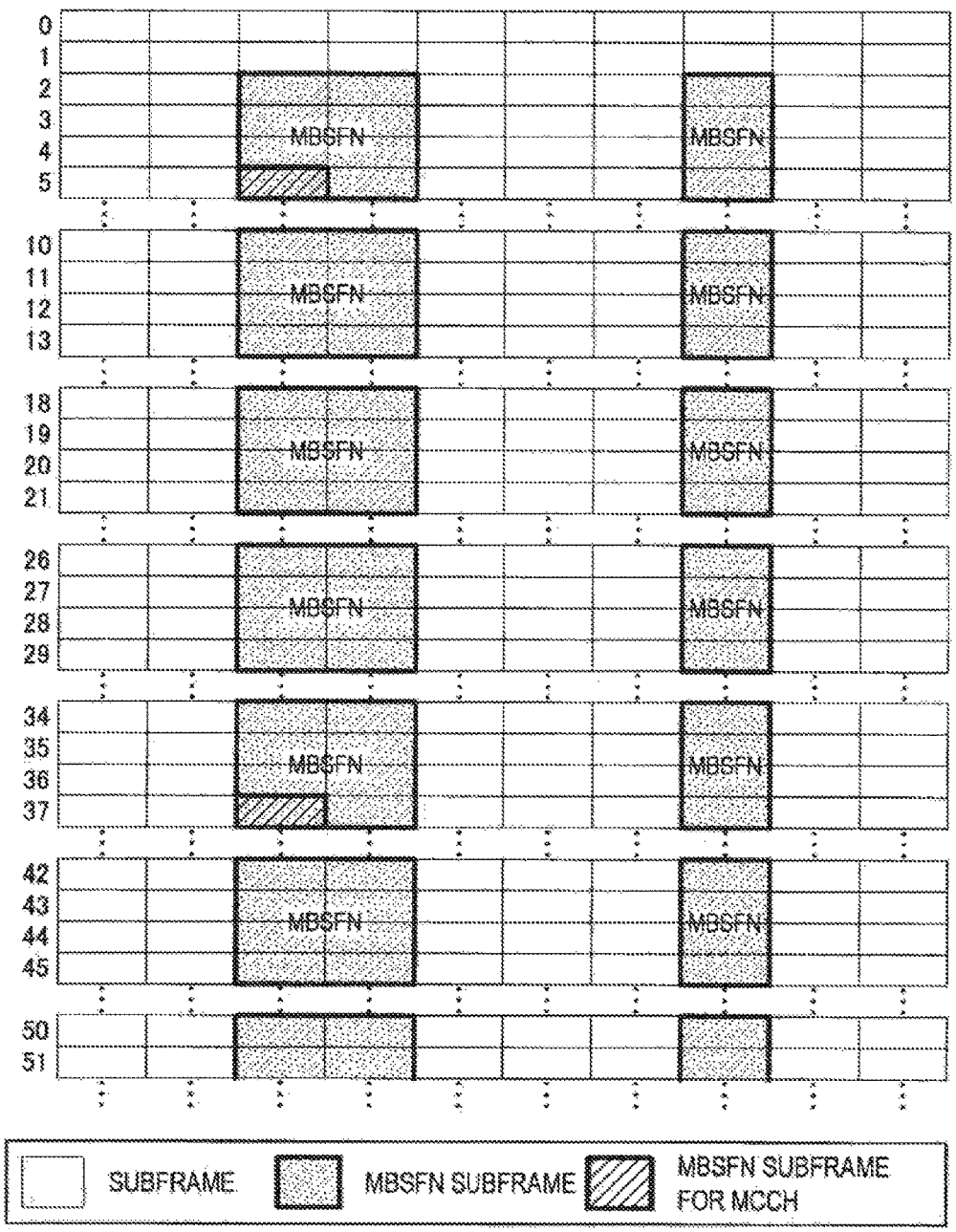
FIG. 6 is an explanatory diagram illustrating examples of subframes in which an MCCH is disposed.

FIG. 6 is an explanatory diagram illustrating examples of the subframes in which the MCCH is disposed. Referring to FIG. 6, the subframes included in a radio frame of each system frame number (SFN) are illustrated. The MBSFN subframes of this example are the same as the MBSFN subframes illustrated in FIG. 3. In this example, the MCCH repetition period is 32 and the MCCH offset is 5. Therefore, a radio frame of the SFN satisfying "SFN mod 32=5" (that is, the SFN of 5, 37, or the like) is a radio frame in which the MCCH is disposed. In this example, the subframe allocation information is "010000." In a case where the FDD is adopted, bits of the subframe allocation indicate subframes #1, #2, #3, #6, #7, and #8. Therefore, of the radio frames, subframe #2 is a subframe in which the MCCH is disposed. In this way, the MCCH is periodically disposed in the MBSFN subframe.

The MCCH and the MTCH are multiplexed in a media access control (MAC) layer, but the terminal apparatus can demodulate the MCCH and the MTCH by multiplexing information of an MAC header.

(c) MBSFN Area Configuration Message

The MBSFN area configuration message is mapped to the MCCH.

(c-1) Common Subframe Allocation (CSA)

First, the MBSFN area configuration message includes a common subframe allocation (CSA) pattern list and a CSA period. The information indicates the MBSFN subframes of the MBSFN area. The CSA pattern list includes a radio frame allocation period, a radio frame allocation offset, and a subframe allocation. Hereinafter, specific examples of the MBSFN subframes indicated by the information will be described with reference to FIG. 7.

Figure 7:
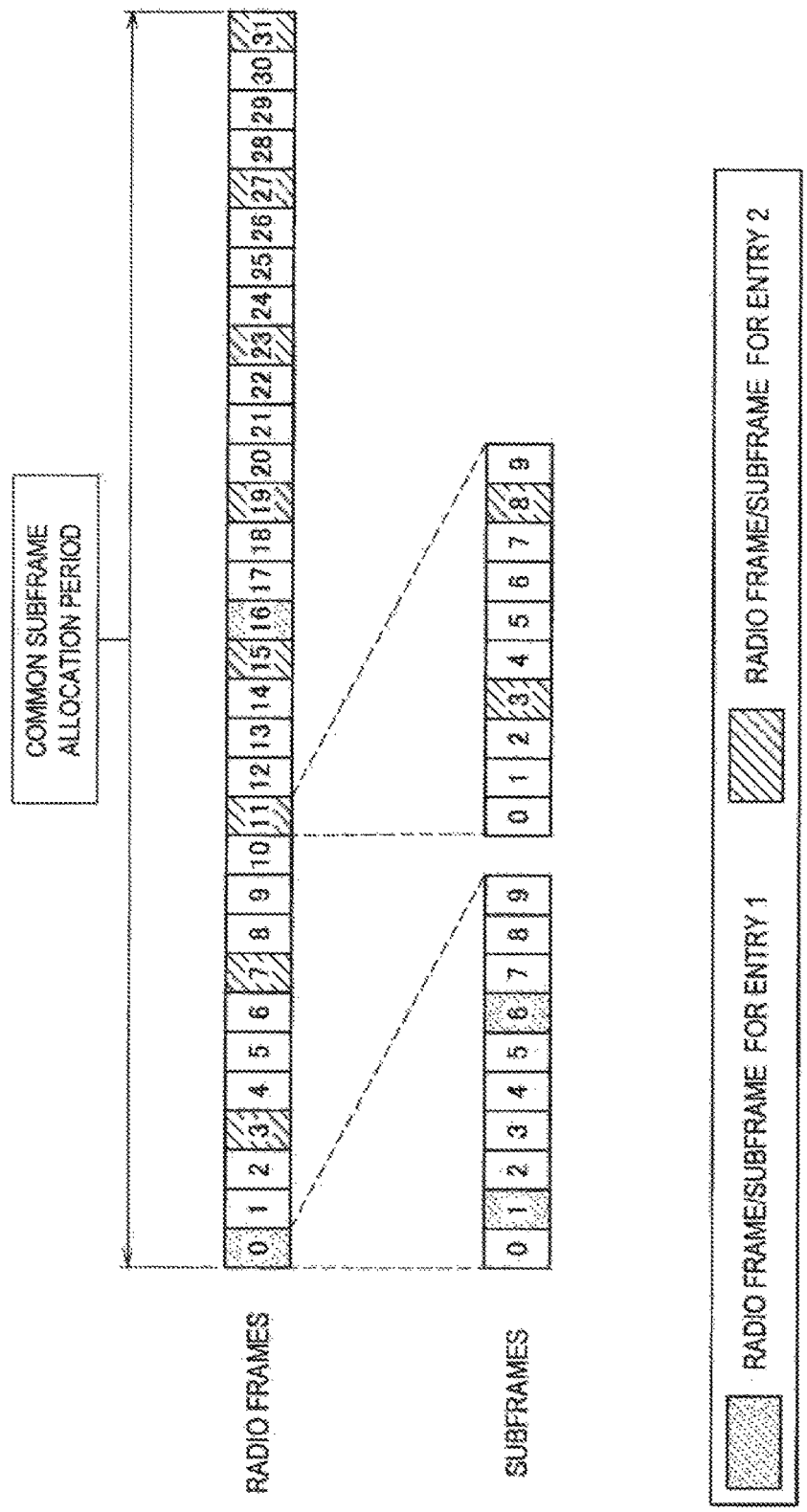
FIG. 7 is explanatory diagram illustrating examples of MBSFN subframes.

FIG. 7 is an explanatory diagram illustrating examples of the MBSFN subframes. Referring to FIG. 7, radio frames extending over the CSA period are illustrated. In this example, the CSA period is 32 radio frames. In this example, the CSA pattern list includes entries 1 and 2. In the entry 1, the radio frame allocation period is 16, the radio frame allocation offset is 0, and the subframe allocation is "100100" of 1 frame pattern (6 bits). Thus, the MBSFN subframes of the entry 1 are subframes #1 and #6 in 2 radio frames in which the SFN is 0 and 16. In the entry 2, the radio frame allocation period is 4, the radio frame allocation offset is 3, and the subframe allocation is "001001" of 1 frame pattern (6 bits). Thus, the MBSFN subframes of the entry 2 are subframes #3 and #8 in 8 radio frames in which the SFN is 3, 7, 11, 15, 19, 23, 27, and 31. Thus, in this example, a total of 20 subframes in the CSA period are illustrated as the MBSFN subframes.

(c-2) PMCH Information

Further, the MBSFN area configuration message includes a PMCH information list. The PMCH information list indicates the MBSFN subframes in which each PMCH is disposed and one or more MTCHs mapped to each PMCH. In the first subframe in the PMCH, MCH scheduling information (MSI) which is scheduling information of the MTCH mapped to the PMCH is transmitted. The PMCH information list also indicates a transmission period of the MSI. The period is referred to as an MCH scheduling period (MSP). Hereinafter, examples of the PMCH and the MTCH mapped to the PMCH will be described with reference to FIG. 8.

FIG. 8 is an explanatory diagram illustrating examples of the PMCH and the MTCH mapped to the PMCH. Referring to FIG. 8, four sets of 20 MBSFN subframes described with reference to FIG. 7 are illustrated. That is, 80 MBSFN subframes over four CSA periods (that is, CSA periods 1 to 4) are illustrated. In this example, of the 20 MBSFN subframes in the CSA periods (32 radio frames), the first to seventh subframes are allocated to a PMCH 1. The eighth to eleventh subframes are allocated to a PMCH 2, the twelfth to fifteenth subframes are allocated to a PMCH 3, and the sixteenth to twentieth subframes are allocated to a PMCH 4. Logical channels 1 and 2 (that is, MTCHs 1 and 2) are mapped to the PMCH 1. A logical channel 3 (that is, an MTCH 3) is mapped to the PMCH 2, a logical channel 4 (that is, an MTCH 4) is mapped to the PMCH 3, and a logical channel 5 (that is, an MTCH 5) is mapped to the PMCH 4. Focusing on the PMCH 1, the MSP of the PMCH 1 is 64 radio frames and the MSI is transmitted with the PMCH 1 every two CSA periods. During the CSA periods 1 and 2, the logical channel 1 (that is, the MTCH 1) is disposed in the first to ninth subframes among the MBSFN subframes allocated to the PMCH 1. The logical channel 2 (that is, the MTCH 2) is disposed in the tenth to the thirteenth subframes. No logical channel (MTCH) is disposed in the fourteenth subframe. During the CSA periods 3 and 4, the logical channel 1 is disposed in the first to eighth subframes among the MBSFN subframes allocated to the PMCH 1. The logical channel 2 is disposed in the ninth to the twelfth subframes. No logical channel (MTCH) is disposed in the thirteenth and fourteenth subframe. As illustrated in FIG. 8, the MCCH is also disposed in the MBSFN subframe.

(6) System Configuration of MBSFN

Figure 9:
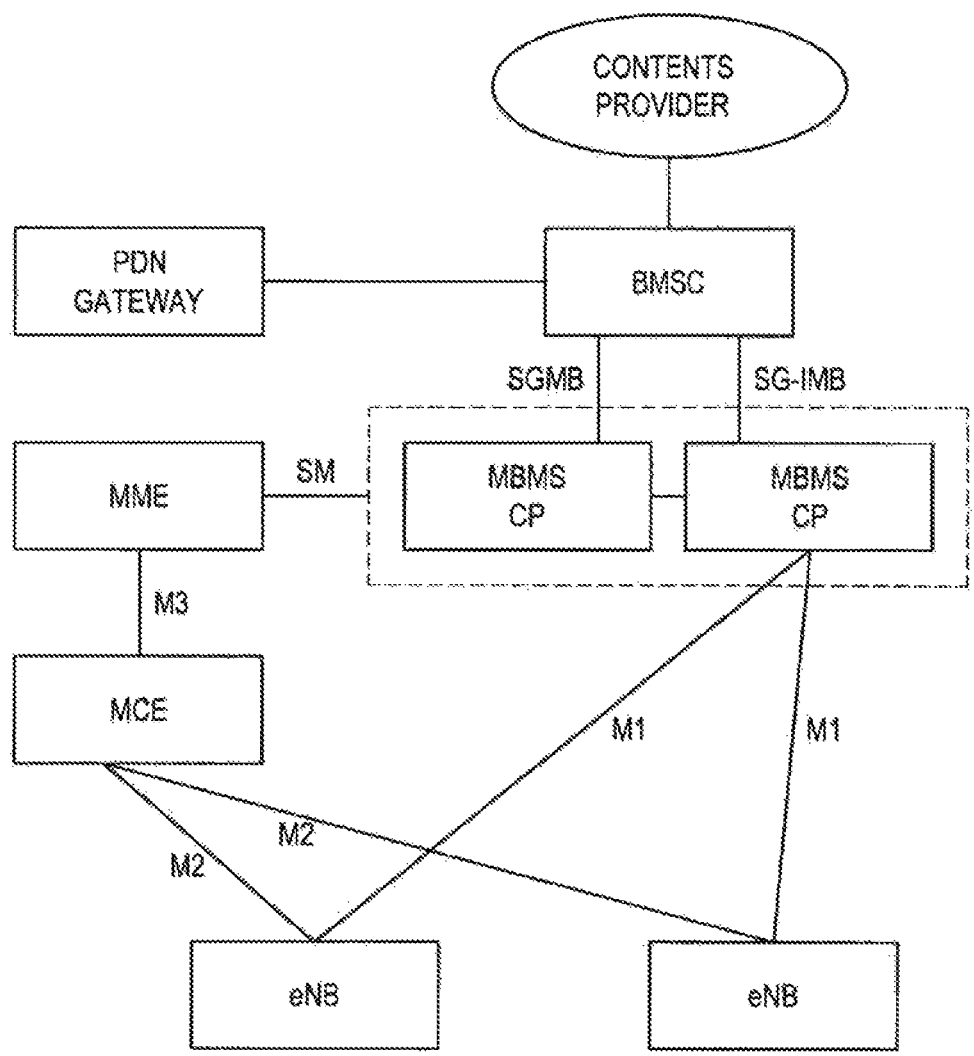
FIG. 9 is an explanatory diagram illustrating an example of the configuration of an LTE network supporting the MBSFN.

An example of the configuration of an LTE network supporting the MBSFN will be described with reference to FIG. 9. FIG. 9 is an explanatory diagram illustrating an example of the configuration of an LTE network supporting the MBSFN. Referring to FIG. 9, the LTE network includes a multi-cell/multicast coordinate entity (MCE), a broadcast/multicast service center (BM-SC), an MBMS gateway (GW), and a mobility management entity (MME), and the like. That nodes are logical nodes. The MCE causes an evolved Node B (eNB) of a cell belonging to the MBSNF area to transmit the same data with the same radio resources. Specifically, for example, the MCE performs scheduling related to the MBSNF in the MBSNF area. The BM-SC performs authentication and charging of a contents provider, data flow control in a core network, and the like. The MBMS-GW transfers multicast IP packets from the BM-SC to the eNB and performs a process on a session control signal via the MME. The MME performs a process on a non-access stratum (NAS).

The example in which one MCE corresponds to a plurality of eNBs has been described, but the MCE is not limited to the related example. For example, each eNB may include the MCE.

«2. Schematic Configuration of System»

Figure 10:
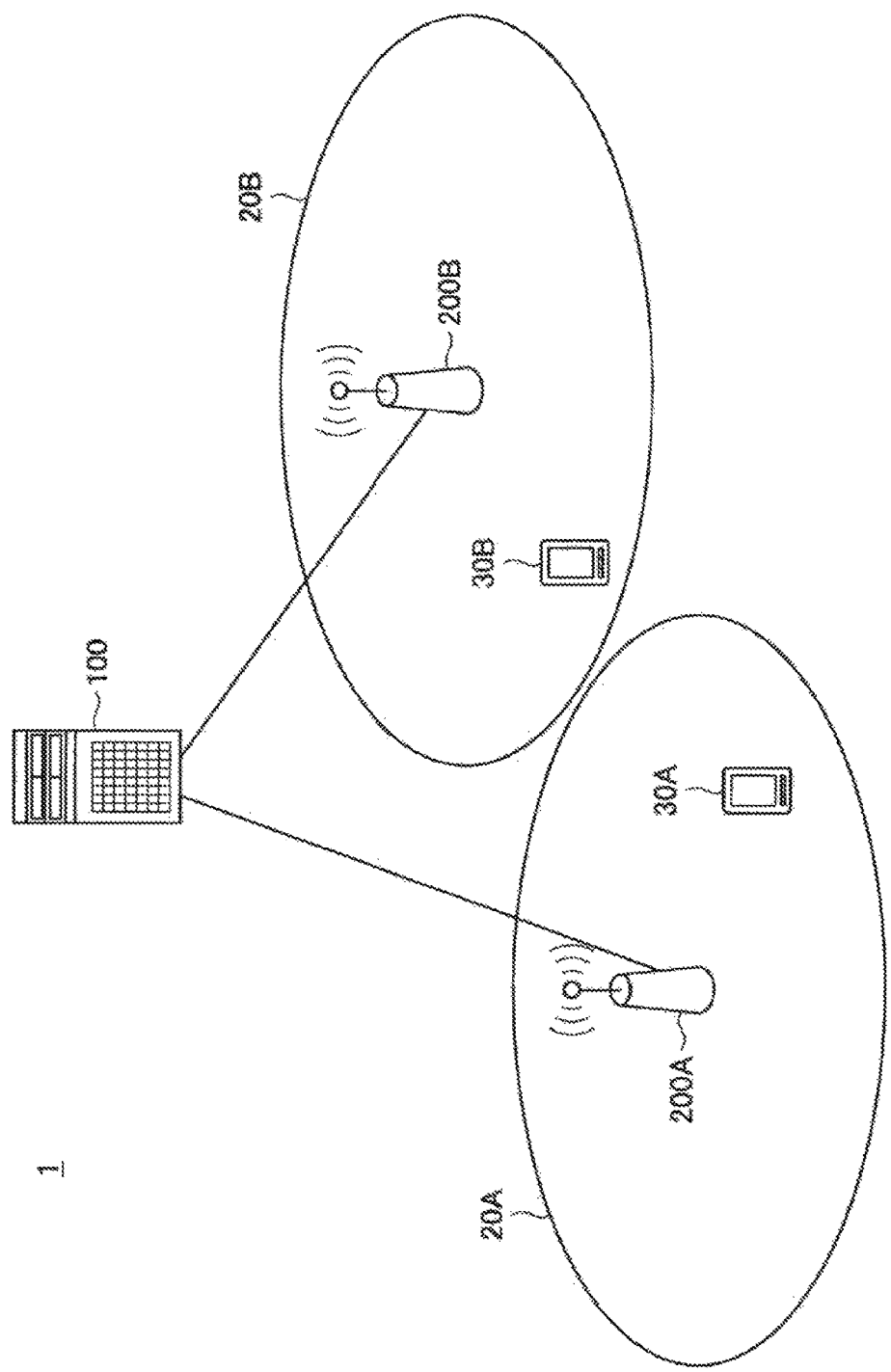
FIG. 10 is an explanatory diagram illustrating an example of a schematic configuration of a system according to an embodiment of the present disclosure.

Next, a schematic configuration of a system 1 according to an embodiment of the present disclosure will be described with reference to FIGS. 10 to 12. FIG. 10 is an explanatory diagram illustrating an example of a schematic configuration of the system 1 according to the embodiment of the present disclosure. Referring to FIG. 10, the system 1 includes a control entity 100, a base station 200, and terminal device 30.

(1) Control Entity 100

(a) Operation

The control entity 100 performs control for the MBSFN.

For example, the control entity 100 operates as a multi-call/multicast coordination entity (MCE). Specifically, for example, the control entity 100 performs an MBMS session start procedure. Further, for example, the control entity 100 provides MBMS scheduling information to the base station (for example, the base station 200).

In addition, the control entity 100 may further operate as an MBMS gateway (MBMS-GW). Specifically, the control entity 100 may receive provided content and distribute the content to the base stations belonging to the MBSFN area. Alternatively, another apparatus different from the control entity 100 may operate as the MBMS-GW.

(b) Frequency Band

Particularly, in the embodiment of the present disclosure, the control entity 100 performs control for the MBSFN in a frequency band shared by a plurality of radio communication systems (hereinafter referred to as a "shared band"). The shared band is used as a component carrier (CC) in the cellular system.

The control entity 100 may further perform control for the MBSFN in a frequency band for a cellular system (hereinafter referred to as a "cellular band"). For example, the cellular band is the CC of the cellular system.

In other words, the shared band is a frequency band included in an unlicensed band (unlicensed band). Therefore, for example, the shared band is the CC of the unlicensed band and can be called a U-CC. Further, in other words, the cellular band is a frequency band included in the licensed band. Therefore, for example, the cellular band is the CC of the licensed band and can be called an L-CC.

(2) Base Station 200

The base station 200 is a base station of the cellular system. As an example, the cellular system is a system conforming to LTE, LTE-Advanced, or a communication standard equivalent thereto.

The base station 200 performs radio communication with a terminal device (for example, the terminal device 30). For example, the base station 200 performs radio communication with a terminal device located in a cell 20 of the base station 200. For example, the base station 200 performs radio communication with the terminal device using the cellular band. Furthermore, for example, the base station 200 performs radio communication with the terminal device using the shared band.

Particularly in the embodiment of the present disclosure, the base station 200 supports the MBSFN and performs MBSFN transmission. Particularly, the base station 200 performs MBSFN transmission in the shared band. Further, the base station 200 may further perform MBSFN transmission in the cellular band.

(3) Terminal Device 30

The terminal device 30 performs radio communication with the base station (for example, the base station 200). For example, the terminal device 30 performs radio communication with the base station using the cellular band and/or the shared band.

(4) Specific Example of System

A more specific example of the system 1 will be described with reference to FIGS. 11 and 12. FIG. 11 is an explanatory diagram illustrating a more specific example of a schematic configuration of the system 1 according to the embodiment of the present disclosure. Referring to FIG. 11, in addition to the control entity 100, the base station 200, and the terminal device 30, a base station 50, a core network 60, and the Internet 70 are illustrated.

(a) Macro Cell and Small Cell

For example, the base station 200 is a base station of a small cell, and the base station 50 is a base station of a macro cell. In other words, the cell 20 is a small cell, and a cell 51 is a macro cell. The base station 50 is connected to the core network 60.

As an example, the base station 200 is a base station of a femtocell. Further, the base station 200 is connected to the Internet 70.

(b) Cellular Systems (b-1) Different Cellular System

For example, the base station 200A and the base station 50A are base stations of a first cellular system, and the core network 60A is a core network of the first cellular system.

For example, the base station 200B and the base station 50B are base stations of a second cellular system and the core network 60B is a core network of the second cellular system. In other words, the base station 200A and the base station 200B are base stations of different cellular systems.

As an example, each of the first and second cellular systems is a system conforming to LTE, LTE-Advanced, or a communication standard equivalent thereto.

(b-2) Different Operators

For example, the first cellular system is a system of a first operator, and the second cellular system is a system of a second operator different from the first operator above. In other words, the base station 200A and the base station 200B are base stations of different operators.

As an example, each of the first and second operators is a mobile network operator (MNO).

(c) Frequency Band

For example, each of the base station 200A and the base station 50A uses a frequency band for the first cellular system, and for example, each of the base station 200B and the base station 50B uses a frequency band for the second cellular system. For example, each of the base station 200A and the base station 200B further uses the shared band. This point will be described below with reference to FIG. 12 using a specific example.

Figure 12:
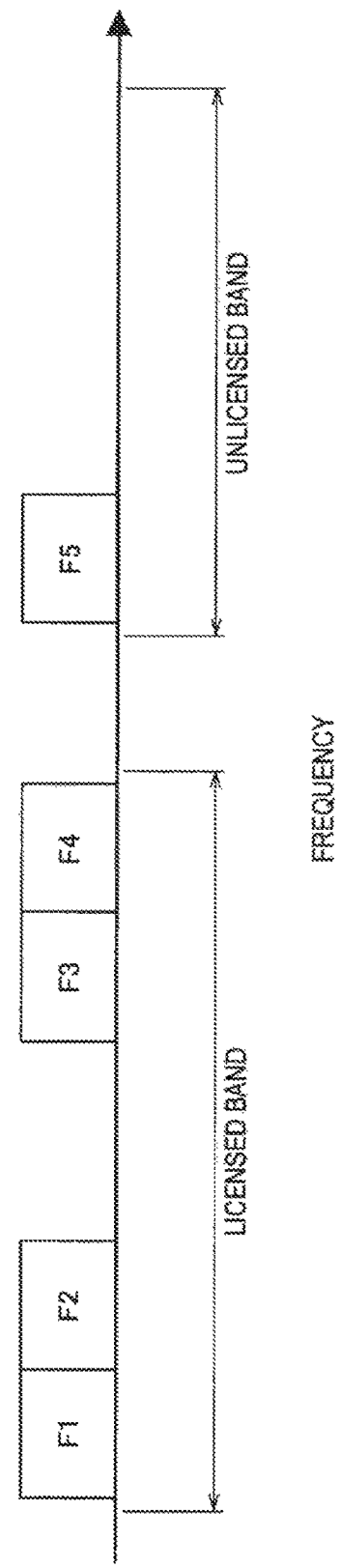
FIG. 12 is an explanatory diagram for describing an example of a frequency band used by a base station.

FIG. 12 is an explanatory diagram for describing an example of a frequency band used by the base station. Referring to FIG. 12, five frequency bands F1 to F5 are illustrated. Each of the frequency bands F1 to F4 is a frequency band included in the licensed band (that is, the cellular band), and the frequency band F5 is a frequency band included in the unlicensed band (that is, the shared band). The frequency bands F1 and F3 are the frequency band for the first cellular system, the base station 50A uses the frequency band F1, and the base station 200A uses the frequency band F3. The frequency bands F2 and F4 are the frequency bands for the second cellular system, the base station 50B uses the frequency band F2, and the base station 200B uses the frequency band F4. In addition, the base station 200A and the base station 200B use the frequency band F5.

(d) MBSFN Area

For example, the base station 200A and the base station 200B belong to an MBSFN area 40 for the MBSFN transmission in the shared band.

«3. Configurations of Apparatuses»

Figure 13:
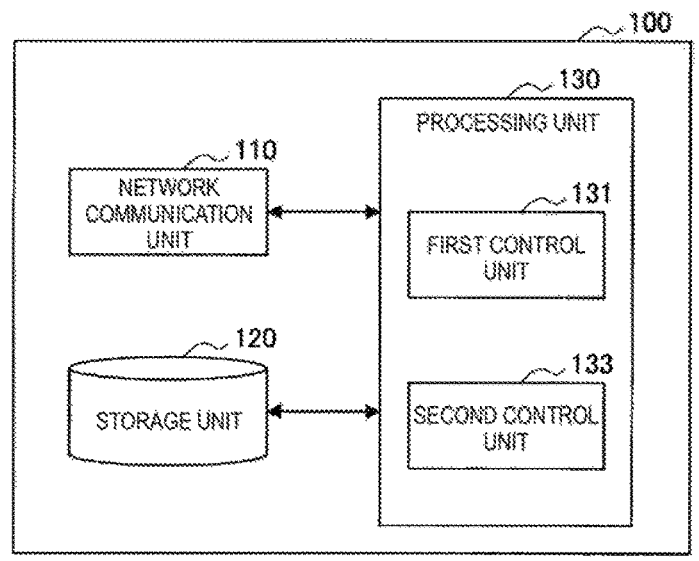
FIG. 13 is a block diagram illustrating an example of a configuration of a control entity according to the embodiment.

Next, an example of configurations of the control entity 100 and the base station 200 according to the embodiment of the present disclosure will be described with reference to FIGS. 13 and 14.

<3.1. Configurations of Control Entity>

First, an example of a configuration of the control entity 100 according to the embodiment of the present disclosure will be described with reference to FIG. 13. FIG. 13 is a block diagram showing an example of a configuration of the control entity 100 according to the embodiment of the present disclosure. Referring to FIG. 13, the control entity 100 includes a communication unit 110, a storage unit 120, and a processing unit 130.

(1) Communication Unit 110

The communication unit 110 performs transmission and reception of information. For example, the communication unit 110 transmits information to another node and receives information from another node. For example, another node includes the base station 200.

(2) Storage Unit 120

The storage unit 120 temporarily or permanently stores programs and data for an operation of the control entity 100.

(3) Processing Unit 130

The processing unit 130 provides various functions of the control entity 100. The processing unit 130 includes a first control unit 131 and a second control unit 133. Further, the processing unit 130 may further include any component other than these components. In other words, the processing unit 130 may also perform an operation other than operations of these components.

The operations of the first control unit 131 and the second control unit 133 will be specifically described in respective embodiments.

<3.2. Configurations of Base Station>

Next an example of a configuration of the base station 200 according to the embodiment of the present disclosure will be described with reference to FIG. 14. FIG. 14 is a block diagram showing an example of a configuration of the base station 200 according to the embodiment of the present disclosure. Referring to FIG. 14, the base station 200 includes an antenna unit 210, a radio communication unit 220, a network communication unit 230, a storage unit 240 and a processing unit 250.

(1) Antenna Unit 210

The antenna unit 210 radiates a signal output by the radio communication unit 220 as radio waves to a space. The antenna unit 210 converts the radio waves in the space into a signal and outputs the signal to the radio communication unit 220.

(2). Radio Communication Unit 220

The radio communication unit 220 performs transmission and reception of the signal. For example, the radio communication unit 220 transmits a downlink signal to the terminal device located in the cell 20, and receives an uplink signal from the terminal device located in the cell 20.

(3) Network Communication Unit 230

The network communication unit 230 performs transmission and reception of information. For example, the network communication unit 230 transmits information to another node and receives information front another node. For example, another node includes the control entity 100.

(4) Storage Unit 240

The storage unit 240 temporarily or permanently stores programs and data for operation of the base station 200.

(5) Processing Unit 250

The processing unit 250 provides various functions of the base station 200. The processing unit 250 includes a first control unit 251 and a second control unit 253. The processing unit 250 may further include any component other than these components. In other words, the processing unit 250 may also perform an operation other than operations of these components.

«4. First Embodiment»

Figure 15:
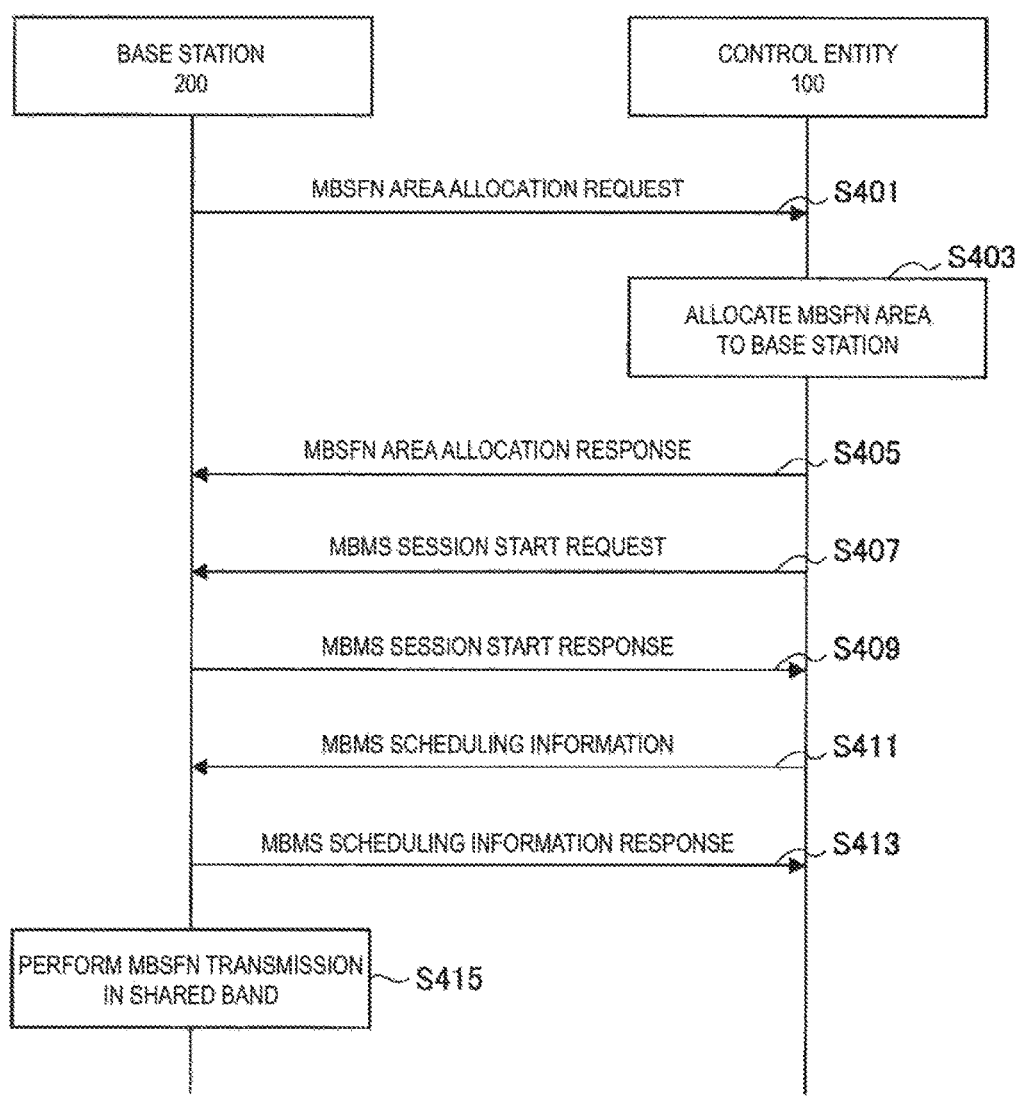
FIG. 15 is a sequence diagram illustrating an example of a schematic flow of a process according to a first embodiment.

Next, a first embodiment of the present disclosure will be described with reference to FIG. 15.

<4.1. Overview>

(1) Technical Problem

Due to the rapid increase in traffic in cellular systems, there are growing concerns about the exhaustion of frequency bands. For this reason, the use of unlicensed bands in cellular systems is under review. For example, the unlicensed bands include a 5 GHz band and a 60 GHz band used in a wireless LAN and the like. As an example, some frequency bands of the 5 GHz band (for example, channels of a wireless LAN) are assumed to be used as downlink component carriers for small cells in a cellular system. In a case where a frequency band included in an unlicensed band is used in the cellular system, the frequency band can be regarded to be a frequency band shared by a plurality of radio communication systems.

However, if each base station of the cellular system uses a frequency band included in the unlicensed band independently, it is difficult to perform MBSFN transmission in the frequency band. In other words, it is difficult to provide a service of MBSFN using the frequency band.

In this regard, it is desirable to provide a mechanism enabling provision of a service of MBSFN using frequency bands shared by a plurality of radio communication systems.

(2) Technical Solution

In the first embodiment, the control entity 100 provides scheduling information of the MBSFN transmission in the frequency band shared by a plurality of radio communication systems to two or more base stations 200 belonging to the MBSFN area for the MBSFN transmission.

Accordingly, it is possible to provide the service of the MBSFN using the frequency band shared by, for example, the plurality of radio communication systems.

<4.2. Technical Characteristics of First Embodiment>

Next, the technical characteristics of the first embodiment will be described.

(1) Provision of the MBSFN Scheduling Information

The control entity 100 provides the scheduling information of the MBSFN transmission in the frequency band shared by the plurality of radio communication systems (that is, the shared band) to two or more base stations 200 belonging to the MBSFN area for the MBSFN transmission.

The first control unit 131 acquires the scheduling information and provides the scheduling information to the two or more base stations 200.

In a case where only one base station 200 belongs to the MBSFN area, the control entity 100 (the first control unit 131) may provide the scheduling information to one base station 200.

(a) Shared Band

The shared band (the frequency band shared by the plurality of radio communication systems) is, in other words, a frequency band included in the unlicensed band. The unlicensed band is a band which is used without license.

For example, the unlicensed band is the 5 GHz band. In this case, for example, the shared band is a channel of a wireless LAN. In other words, the shared band is a frequency band which is shared between the cellular system and the wireless LAN or the like. Alternatively, the unlicensed band may be any other band such as the 3.5 GHz band/or the 60 GHz band.

As an example, referring back to FIG. 12, the shared band is the frequency band F5.

For example, the shared band is used as a component carrier. For example, the shared band is used as a component earner dedicated to a downlink.

(b) Scheduling Information (b-1) Information Included in Scheduling Information

For example, the scheduling information includes information indicating the MBSFN subframe. More specifically, for example the scheduling information includes a subframe configuration list and a common subframe allocation period.

In order to prevent a subframe used for system information and paging from being used as the MBSFN subframe, the MBSFN subframe is typically a subframe other than 0/4/5/9 in the case of FDD and a subframe other than 0/1/2/5/6 in the case of TDD. However, for example, paging is not performed in the shared band, and the MBSFN subframe may be a subframe other than subframes 0/5.

For example, the scheduling information includes information indicating a configuration of the PMCH. More specifically, for example, the scheduling information includes a PMCH configuration list. The PMCH confirmation list includes a PMCH configuration and an MBMS session list of each PMCH.

For example, the scheduling information includes identification information of the MBSFN area. More specifically, for example, the scheduling information includes an MBSFN area identity (ID).

(b-2) Example of Scheduling Information

As an example, the scheduling, information is information included in an MBMS scheduling information message, that is, an MBSFN area configuration item information element (IE) included in the MBSFN area configuration list.

(c) MBSFN Area (c-1) Two or More Base Stations Belonging to MBSFN Area

For example, the two or more base stations 200 belonging to the MBSFN area include the base stations 200 of different cellular systems. Specifically, for example, the two or more base stations 200 include the base station 200 of the first cellular system and the base station 200 of the second cellular system different from the first cellular system.

For example, the two or more base stations 200 include the base stations 200 of different operators (for example different MNOs). Specifically, for example, the first cellular system is a system of the first operator, and the second cellular system is a system of the second operator different from the first operator. In other words, the two or more base stations 200 include the base station 200 of the first operator and the base station 200 of the second operator.

As an example, referring back to FIGS. 11 and 12, the base station 200A of the first cellular system of the first operator and the base station 200B of the second cellular system of the second operator belong to the MBSFN area 40. In this case, the control entity 100 provides the scheduling information for the MBSFN transmission in the frequency band F5 to the base station 200A and the base station 200B belonging to the MBSFN area 40.

As described above, for example, the base stations 200 of the different cellular systems belong to the MBSFN area, and the control entity 100 (the first control unit 131) provides the scheduling information to the base stations 200 of the different cellular systems (for example, the base stations 200 of the different operators). As a result, for example, the base stations of the different cellular systems can perform the MBSFN transmission. In other words, different cellular systems can provide the service of the MBSFN using the same frequency band (the shared band). Thus, the frequency band is more effectively used than in the case in which the different cellular systems provide the MBSFN service using different frequency bands.

The first embodiment is not limited to this example. For example, the two or more base stations 200 belonging to the MBSFN area may be base stations of the same cellular system.

(c-2) Corresponding Frequency Band

The MBSFN area may be an area dedicated to one shared band/or may be a common area between two or more shared bands. Referring back to FIGS. 11 and 12, the MBSFN area 40 may be an area dedicated to the frequency band F5 or may be a common area between two or more shared bands including the frequency band F5.

Alternatively, the MBSFN area may be a common area between two or more frequency bands including one or more cellular bands and one or more shared bands.

As described above, the base station 200 provides the scheduling information of the MBSFN transmission in the shared band to the two or more base stations 200 belonging to the MBSFN area for the MBSFN transmission. Thus, for example, it is possible to provide the service of the MBSFN using the shared band.

(2) MBSFN Transmission According to MBSFN Scheduling Information

The base station 200 performs the MBSFN transmission in the shared band in accordance with the scheduling information for the MBSFN transmission in the shared band which is provided from the control entity 100.

The second control unit 253 acquires the scheduling information and controls the MBSFN transmission in the shared band by the base station 200 in accordance with the scheduling information.

(a) Example of the MBSFN Transmission

As an example, referring back to FIGS. 11 and 12, the control entity 100 provides the scheduling information for the MBSFN transmission in the frequency band F5 to each of the base station 200A and the base station 200B belonging to the MBSFN area 40. Then, each of the base station 200A and the base station 200B performs the MBSFN transmission in the frequency band F5 in accordance with the scheduling information.

(b) Control Example

For example, the second control unit 253 recognizes the MBSFN subframes on the basis of the scheduling information and maps a signal of a corresponding PMCH to the radio resources of the shared band in each of the MBSFN subframes.

(3) Allocation of MBSFN Area

For example, the control entity 100 (the second control unit 133) allocates the MBSFN area for the MBSFN transmission in the shared band to the base station 200.

(a) Example of Allocation of MBSFN Area

As an example, referring back to FIGS. 11 and 12, the control entity 100 allocates the MBSFN area 40 for the MBSFN transmission in the frequency band F5 to each of the base station 200A and the base station 200B.

For example, as described above, the control entity 100 (the first control unit 251) can allocate the MBSFN area for the MBSFN transmission in the shared band to the base stations 200 of the different cellular systems (for example, the base stations of the different operators).

The control entity 100 (the first control unit 251) may allocate the MBSFN area for the MBSFN transmission in the shared band to only the base stations 200 of the same cellular system.

(b) Allocation According to Request

For example, the base station 200 (the first control unit 251) requests the control entity 100 to allocate the MBSFN area to the base station 200. In response to the request from the base station 200, the control entity 100 (the second control unit 133) allocates the MBSFN area for the MBSFN transmission in the shared band to the base station 200.

For example, the base station 200 transmits an MBSFN area allocation request message to the control entity 100. Upon receiving this message, the control entity 100 allocates the MBSFN area to the base station 200.

For example, the base station 200 stores, for example, an IP address and/or a host name of the control entity 100. Accordingly, the base station 200 can transmit the request to the control entity 100.

Figure 11:
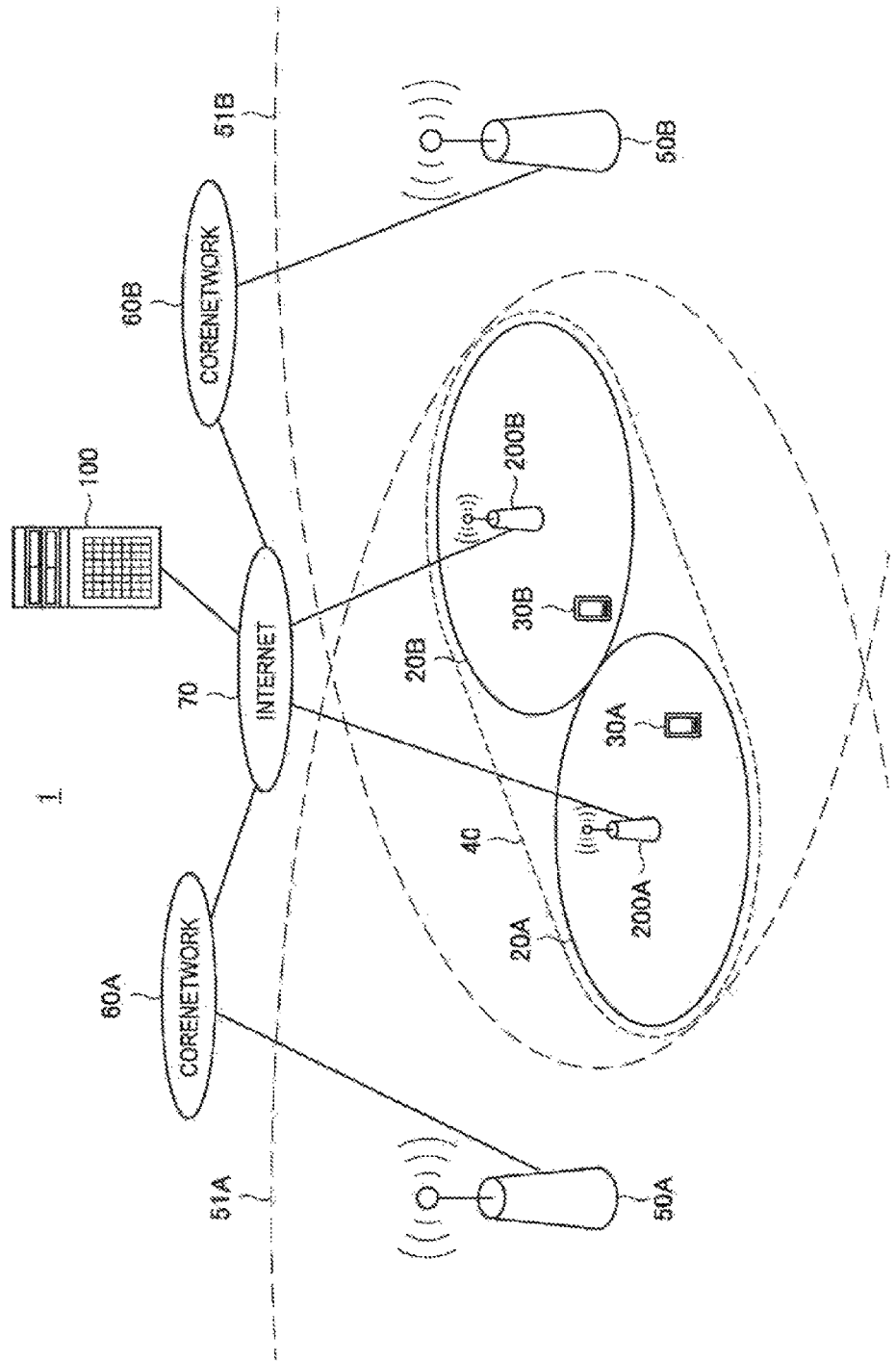
FIG. 11 is an explanatory diagram illustrating a more specific example of a schematic configuration of the system according to the embodiment.

As an example, referring back in FIG. 11, the base station 200A requests the control entity 100 to allocate the MBSFN area, and the control entity 100 allocates the MBSFN area 40 to the base station 200A.

The base station 200 may request the control entity 100 to allocate the MBSFN area for the MBSFN transmission in the shared band. Alternatively, the base station 200 may request the control entity 100 to allocate the MBSFN area for the MBSFN transmission in any one of frequency bands which are not limited to the shared band.

(c) Allocation Method

For example, the control entity 100 (the first control unit 251) allocates the MBSFN area suitable for the base station 200 to the base station 200.

(c-1) Position/Neighboring Cell/Measurement Result

Position

For example, the control entity 100 (the first control unit 251) allocates the MBSFN area to the base station 200 on the basis of the position of the base station 200.

More specifically, for example, the control entity 100 allocates the MBSFN area that is located near the base station 200 to the base station 200. In a case where there is no MBSFN area near the base station 200, control entity 100 may allocate a new MBSFN area to the base station 200.

Further, for example, the base station 200 (the first control unit 251) notifies the control entity 100 of the position of the base station 200. As an example, the base station 200 transmits position information obtained from a GPS receiver to the control entity 100.

Alternatively, another apparatus may notify the control entity 100 of the position, or the position may be known to the control entity 100.

Neighboring Cell

The control entity 100 may allocate the MBSFN area to the base station 200 on the basis of a neighboring cell of the base station 200.

More specifically, the control entity 100 estimates the position of the base station 200 on the basis of the neighboring cell of the base station 200, and on the basis of the estimated position, transmits the MBSFN area to the base station 200. Alternately, the control entity 100 may allocate any MBSFN area to which the neighboring cell of the base station 200 belongs to the base station 200.

Further, the base station 200 (the first control unit 251) may give a notification to the control entity 100 of the neighboring cell of the base station 200. For example, the base station 200 may detect the neighboring cell of the base station 200 on the basis of a downlink signal of the neighboring cell (for example, a synchronization signal) and notify the control entity 100 of the neighboring cell.

Alternatively, another apparatus may notify the control entity 100 of the neighboring cell, or the neighboring cell may be known to the control entity 100.

Measurement Result

The control entity 100 may allocate the MBSFN area to the base station 200 on the basis of a measurement result for the neighboring cell by the base station 200.

More specifically, the control entity 100 estimates the position of the base station 200 on the basis of the measurement result, and allocates the MBSFN area to the base station 200 on the basis of the estimated position. Alternatively, the control entity 100 may recognize the neighboring cell of the base station 200 on the basis of the measurement result and may allocate the MBSFN area to the base station 200 on the basis of the neighboring cell.

Further, the base station 200 (the first control unit 251) may notify the control entity 100 of the measurement result for the neighboring cell by the base station 200. As an example, the base station 200 may perform measurement for the neighboring cell using the CRS transmitted from the neighboring cell.

The measurement result may be a measurement result in the cellular band. Alternatively, the measurement result may be a measurement result in the shared band.

As described above, the control entity 100 (the first control unit 251) allocates the MBSFN area to the base station 200 on the basis of the position of the base station 200, the neighboring cell of the base station 200, or the measurement result for the neighboring cell by the base station 200. Thus, for example, it is possible to allocate the MBSFN area located near the base station 200 to the base station 200.

(c-2) Desired Service

For example, the control entity 100 (the first control unit 251) allocates the MBSFN area to the base station 200 on the basis of a desired service of the base station 200.

More specifically, for example, the control entity 100 allocates an MBSNF area corresponding to the desired service of the base station 200 to the base station 200. For example, in a case where there is an existing MBSFN area corresponding to the service, the control entity 100 allocates the existing MBSFN area to the base station 200. In a case where there is no existing MBSFN area corresponding to the service, the control entity 100 allocates a new MBSFN area corresponding to the service to the base station 200.

The service may be a service (for example, a program) provided by a contents provider. Alternatively, the service may be an MBMS service or an MBMS session.

Accordingly, for example, a desired service is provided.

Further, for example, the base station 200 (the first control unit 251) notifies the control entity 100 of the desired service of the base station 200. As an example, the base station 200 transmits identification information of the service to the control entity 100.

Alternatively, another apparatus may notify the control entity 100 of the desired service of the base station 200.

Alternatively, for example, the control entity 100 may allocate the MBSFN area to the base station 200 on the basis of any desired service (a desired service of the terminal device) rather than the desired service of the base station 200. In this case, the base station 200 or another apparatus may notify the control entity 100 of the desired service.

(c-3) Available Frequency Band

For example the control entity 100 (the first control unit 251) allocates the MBSFN area to the base station 200 on the basis of a frequency band available to the base station 200. In other words, the frequency band available to the base station 200 is a frequency band which is supported by the base station 200.

For example, the control entity 100 allocates the MBSFN area to the base station 200 on the basis of the shared band available to the base station 200 (that is, the shared band supported by the base station 200).

More specifically, for example, the control entity 100 allocates the MBSNF area for the MBSFN transmission in the shared band available to the base station 200 to the base station 200. The MBSFN area may be an existing MBSFN area or may be a new MBSFN area.

Thus, for example, the MBSFM area in which the base station 200 can perform the MBSFN transmission is allocated to the base station 200.

Further, for example, the base station 200 (the first control unit 251) notifies the control entity 100 of the frequency band available to the base station 200. As an example, the base station 200 transmits the identification information of the frequency band to the control entity 100.

Alternatively, another apparatus may notify the control entity 100 of the frequency band, or the frequency band may be known to the control entity 100.

(c-4) MBSFN Area/Measurement Result

MBSFN Area

The control entity 100 (the first control unit 251) may allocate the MBSFN area to the base station 200 on the basis of the MBSFN area detected by the base station 200. The base station 200 (the first control unit 251) may notify the control entity 100 of the MBSFN area detected by the base station 200.

For example, the base station 200 may detect the MBSFN area on the basis of system information (for example, an SIB 13) of the neighboring cell and notify the control entity 100 of the detected MBSFN area.

As an example, in a case where the base station 200 detects the MBSFN area corresponding to the desired service, the base station 200 may notify the control entity 100 of the MBSFN area. Then, the control entity 100 may allocate the MBSFN area to the base station 200.

As another example, in a case where the base station 200 does not detect the MBSFN area corresponding to the desired service, the base station 200 may notify the control entity 100 of the MBSFN area detected by the base station 200 and the desired service. Then, the control entity 100 may allocate the MBSFN area corresponding to the desired service which is the MBSFN other than the MBSFN area detected by the base station 200, to the base station 200.

Thus, for example, it is possible to more easily allocate the MBSFN area suitable for the base station 200.

Measurement Results for MBSFN Area

The control entity 100 (the first control unit 251) may allocate the MBSFN area to the base station 200 on the basis of the measurement result for the MBSFN area by the base station 200. Further, the base station 200 (the first control unit 251) may notify the control entity 100 of the measurement result for the MBSFN area by the base station 200.

For example, the base station 200 may detect the MBSFN area on the basis of the system information of the neighboring cell (for example, the SIB 13), perform measurement for the MBSFN area using an MBSFN-RS, and notify the control entity 100 of the measurement result.

As an example, the control entity 100 may allocate an MBSFN area associated with a preferable measurement result (for example an MBSFN area associated with high reception power) to the base station 200.

(d) Operation Associated with Allocation of MBSFN Area

The control entity 100 (the first control unit 251) may perform other operations during the allocation of the MBSFN area for the MBSFN transmission in the shared band.

(d-1) Notification of Allocated MBSFN Area

For example, the control entity 100 (the first control unit 251) notifies the base station 200 of the allocated MBSFN area.

Specifically, for example, the control entity 100 transmits a response message (for example, an MBSFN area allocation response message) to the base station 200 in response to the MBSFN area allocation request message. The control entity 100 notifies the base station 200 of the allocated MBSFN area through the response message.

The control entity 100 may notify the base station 200 of the allocated MBSFN area through an MBMS scheduling information message. Alternatively, the control entity 100 may notify the base station 200 of the allocated MBSFN area through the MBMS session start request message.

(d-2) Shared Band Use Permission

For example, the control entity 100 (the first control unit 251) permits the base station 200 to use the shared band. Then, the control entity 100 allocates the MBSFN area for the MBSFN transmission in the shared band to the base station 200.

(d-3) Allocation of Shared Band

The MBSFN area and the shared band may not be uniquely associated with each other. In this case, the control entity 100 (the first control unit 251) may allocate the shared band to the base station 200 in addition to the MBSFN area. Further, the control entity 100 (the first control unit 251) may allocate the shared band to the base station 200 on the basis of the frequency band available to the base station 200.

Further, the control entity 100 may notify the base station 200 of the allocated shared band together with the allocated MBSFN area.

In a case where the MBSFN area and the shared band are uniquely associated with each other, the shared band is also allocated with the allocation of the MBSFN area.

(d-4) Allocation of Transmission Power

The control entity 100 (the first control unit 251) may allocate transmission power of the MBSFN transmission, to the base station 200 together with the MBSFN area. For example, the control entity 100 may allocate the transmission power to the base station 200 on the basis of the position of the base station 200 or the like.

Further, the control entity 100 may notify the base station 200 of the allocated transmission power together with the allocated MBSFN area.

(e) Consideration of Radar System

As an example, the control entity 100 (the second control unit 133) allocates an MBSFN area for MBSFN transmission in a shared band used by a radar system to the base station 200. For example, that the shared band is a shared band of the 5 GHz band.

(e-1) First Example

As a first example, under the condition that the use of the shared band by the base station 200 does not interfere with radar waves of the shared band the base station 200 is permitted to use the shared band, and the MBSFN area for the MBSFN transmission in the shared band is allocated to the base station 200.

Specifically, for example, the control entity 100 holds information indicating a time and a region in which the radar waves of the shared band are entitled in advance. In this case, if the position of the base station 200 is not included in the region in winch the radar waves are emitted in an MBSFN transmission period, the control entity 100 (the second control unit 133) permits the base station 200 to use the shared band, and allocates the MBSFN area for the MBSFN transmission in the shared band to the base station 200.

Alternatively, the base station 200 may notify the control entity 100 of the detection result of the radar waves in the shared band. In this case, if the radar waves in the shared band are not detected by the base station 200, the control entity 100 (the second control unit 133) may permit the base station 200 to use the shared band and allocate the MBSFN area for the MBSFN transmission in the shared band to the base station 200.

Alternatively, the base station 200 may request the control entity 100 to allocate the MBSFN area for the MBSFN transmission in the shared band in a case where the radar waves in the shared band are not detected.

(e-2) Second Example

As a second example, the base station 200 may perform the MBSFN transmission only in the period in which the use of the shared band by the base station 200 does not interfere with the radar waves of the shared band.

For example, the scheduling information of the MBSFN transmission in the shared band which is provided from the control entity 100 to the base station 200 may be intended for the period in which the radar waves are not emitted to the MBSFN area for the MBSFN transmission. The control entity 100 may perform scheduling for the period in which the radar waves are not emitted to the MBSFN area.

Alternatively, the base station 200 may perform the MBSFN transmission in the shared band in a case where the radar waves in the shared band are not detected.

(F) Cellular Band

The base station 200 may allocate the MBSFN area for the MBSFN transmission in the cellular band to the base station 200.

As an example, referring back to FIGS. 11 and 12, the control entity 100 may allocate the MBSFN area for the MBSFN transmission in the frequency band F3 to the base station 200A.

(3) Operation for Reception by Terminal Device (a) Use of Shared Band by Terminal Device (a-1) Discovery of Cell of Shared Band Notification of Measurement Object For example, the base station (the base station 200 and/or the base station 50) notifies the terminal device 30 of the shared band as a measurement object. More specifically, for example, the base station (the base station 200 or the base station 50) notifies the terminal device 30 of a plurality of frequency bands including the shared band (that is, a list of frequency bands) as the measurement object. Thus, for example, the terminal device 30 can discover the cell of the shared band.

As an example, referring back to FIGS. 11 and 12 the base station 50A of a macro cell 51A notifies the terminal device 30A of the frequency bands F1, F3, and F5 as the measurement objects. Thus, for example, the terminal device 30A can discover the cell 20 (the small cell) of the frequency band F5.

The base station 50A of the macro cell 51A may not notify the terminal device 30A of the frequency band F5 serving as the shared band as the measurement object, and the base station 200A of the cell 20A (the small cell) may notify the terminal device 30A of the frequency band F5 as the measurement object. Thus, for example, the terminal device 30A can discover the cell 20 (the small cell) of the frequency band F5.

Notification of System Information

The base station (the base station 200 and/or the base station 50) may give a notification of system information indicating a list of frequency bands, and the shared band (for example, the frequency band F5) may be included in the list. The system information may be an SIB 5 and may farther indicate the cell of the shared band (for example, the cell 20 of the frequency band F5). Thus, for example, the terminal device 30 can discover the cell of the shared band.

Autonomous Discovery by Terminal Device

The terminal device 30 may autonomously monitor the shared band. More specifically the terminal device 30 may autonomously monitor the shared band by making an attempt to detect a synchronization signal transmitted through the shared band (for example, the frequency band F5). Thus, for example, the terminal device 30 can discover the cell in the shared band (for example, the cell 20 of the frequency band F5).

(a-2) Series of Operations of Terminal Device

For example, the terminal device 30 in a connection mode (for example, an RRC connection mode) detects a synchronization signal transmitted in the shared band and performs frame synchronization. Then, the terminal device 30A acquires the system information for the shared band. Further, the terminal device 30 performs measurement for the shared band (that is, measurement using the CRS transmitted in the shared band), and transmits a measurement report to the base station (for example, the base station 200 or the base station 50). As a result, for example, the base station adds the shared band as an SCC of the terminal device 30. Then, the terminal device 30 starts to use the shared band.

(b) Transmission of Information Related to MBSFN (b-1) MBSFN Subframe

For example, the base station 200 reports the system information of the shared band (for example, an SIB 2) indicating the MBSFN subframe of the shared band. The terminal device 30 recognizes the MBSFN subframe of the shared band on the basis of the system information.

Thus, for example, the terminal device 30 can perform the measurement using the CRS transmitted in a subframe other than the MBSFN subframe in the shared band. In other words, the MBSFN subframe can be excluded from the measurement object.

(b-2) MCCH Configuration

For example, the base station 200 reports system information of the shared band (for example, the SIB 13) indicating an MCCH configuration of the shared band. The terminal device 30 recognizes the MCCH of the shared band on the basis of the system information.

(b-3) MBSFN Area Configuration for example, the base station 200 transmits an MBSFN area configuration message of the shared band on the MCCH of the shared band. The MBSFN area configuration message indicates the MBSFN subframe and the PMCH configuration. The terminal device 30 recognizes the MBSFN subframe, the PMCH configuration, and the like and receives a desired MBMS session in response to the MBSFN transmission of the base station 200.

(4) Use of Shared Band in Subframe Other than MBSFN Subframe (a) Subframe Other than MBSFN Subframe The base station 200 may receive the system information of the shared band reported by the base station of the neighboring cell and recognize the MBSFN subframe of the shared band in the neighboring cell. Further, the base station 200 may use the shared band in the subframe other than the MBSFN subframe. Furthermore, the base station 200 may detect the synchronization signal of the neighboring cell and match a frame timing with the neighboring cell.

(b) Blank Subframe

The base station 200 (the second control unit 253) may report a subframe in which the base station 200 does not use the shared band among subframes other than the MBSFN subframe. For example, the base station 200 may report, the system information of the shared band indicating the subframe in which the base station 200 does not use the shared band (hereinafter referred to as a "blank subframe"). Further, the base station 200 may receive the system information of the shared band reported by the base station of the neighboring cell and recognize the blank subframe for the base station of the neighboring cell. Furthermore, the base station 200 may use the shared band in the blank subframe. Thus, for example it is possible to use the shared band while avoiding interference with other base stations.

In a case where there are a plurality of neighboring cells, the base station 200 may use the shared band in a blank subframe that is common among the plurality of neighboring cells. The blank subframe may be a subframe in which a signal can be transmitted in a control region (for example, 1 to 3 OFDM symbols), but a signal is transmitted in a data region (for example, 4 to 14 OFDM symbols).

<4.3. Flow of Process>

Next, an example of a process according to the first embodiment will be described with reference to FIG. 15. FIG. 15 is a sequence diagram illustrating an example of a schematic flow of a process according to the first embodiment.

The base station 200 requests the control entity 100 to allocate the MBSFN area to the base station 200 (S401). For example, the base station 200 transmits the MBSFN area allocation request message to the control entity 100. For example the MBSFN area allocation request message indicates the position of the base station 200, the desired service, the frequency band available to the base station 200, and the like.

The control entity 100 allocates the MBSFN area for the MBSFN transmission in the shared band to the base station 200 in response to the request from the base station 200 (S403). For example, the control entity 100 allocates the MBSFN area to the base station 200 on the basis of the position of the base station 200, the desired service, and the frequency band available to the base station 200. The control entity 100 permits the base station 200 to use the shared band.

Thereafter, the control entity 100 transmits a response to the request from the base station 200 (S405). For example, the control entity 100 transmits the MBSFN area allocation response message to the base station 200 (S405). For example, the MBSFN area allocation response message indicates the allocated MBSFN area.

Thereafter, the control entity 100 transmits the MBMS session start request message to the base station 200 (S407), and the base station 200 transmits an MBMS session start response message to the control entity 100 (S409).

Further, the control entity 100 acquires the scheduling information for the MBSFN transmission in the shared band and provides the scheduling information to the two or more base stations 200 belonging to the MBSFN area for the MBSFN transmission (S411). For example, the control entity 100 transmits an MBSFN scheduling information message to the two or more base stations 200. Each of the two or more base stations 200 transmits an MBSFN scheduling information response message to the control entity 100 (S413).

The two or more base stations 200 acquire the scheduling information and perform the MBSFN transmission in the shared band in accordance with the Scheduling information. (S415).

«5. Second Embodiment»

Figure 22:
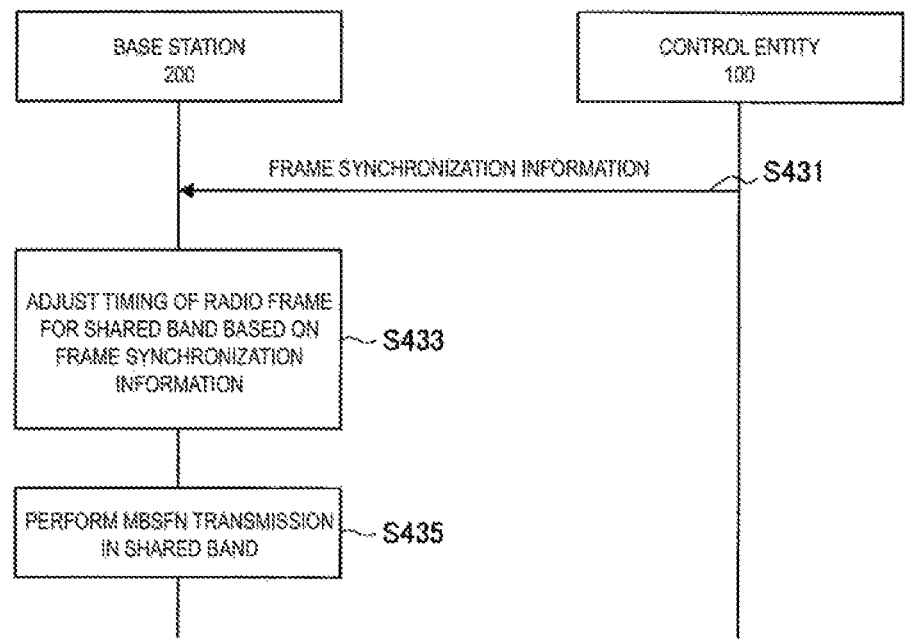
FIG. 22 is a sequence diagram illustrating an example of a schematic flow of a process according to a second embodiment.

Next, a second embodiment of the present disclosure will be described with reference to FIGS. 16 and 22.

<5.1. Overview>

(1) Technical Problem

Due to the rapid increase in traffic in cellular systems, there are growing concerns about exhaustion of frequencies. For this reason, the use of unlicensed bands in cellular systems is under review. For example, the unlicensed bands include a 5 GHz band and a 60 GHz band used in a wireless LAN and the like. As an example, some frequency bands of the 5 GHz band (for example, channels of a wireless LAN) are assumed to be used as downlink component carriers for small cells in cellular systems. In a case where a frequency band included in an unlicensed band is used in a cellular system the frequency band can be awarded to be a frequency band shared by a plurality of radio communication systems.

The MBSFN transmission can also be performed in the frequency band included in the unlicensed band, similarly to the frequency band included in the licensed band. In addition, the frequency band can be used by different cellular systems. Thus, base stations of different cellular systems (for example, base stations of different operators) are also considered to belong to the MBSFN area for the MBSFN transmission in the frequency band.

However, for example, the base stations of the different cellular systems (for example, the base stations of the different operators) are not synchronized in radio frames. For this reason, the base stations of the different cellular systems are unable to perform the MBSFN transmission even if the same MBSFN scheduling information is provided. This is because in the MBSFN transmission, the same signal is transmitted using the same radio resources.

In this regard, it is desirable to provide a mechanism that enables the base stations of the different cellular systems to perform the MBSFN transmission in the frequency band shared by a plurality of radio communication systems.

(2) Technical Solution

In the second embodiment, the control entity 100 provides frame synchronization information for synchronizing a radio frame for the frequency bands shared by a plurality of radio communication systems to the base stations 200 belonging to the MBSFN area for the MBSFN transmission in the frequency band. The base stations 200 of the different cellular systems belong to the MBSFN area.

Thus, for example, the base stations of the different cellular systems can perform the MBSFN transmission in the frequency band shared by a plurality of radio communication systems.

<5.2. Technical Characteristics of Second Embodiment>

Next, technical characteristics according to the second embodiment will be described with reference to FIGS. 16 to 21.

(1) Synchronization of Frame Timing for Shared Band Between Base Stations

The control entity 100 provides the frame synchronization information for synchronizing the radio frame for the frequency band shared by a plurality of radio communication systems )that is, the shared band) to the base stations 200 belonging to the MBSFN area for the MBSFN transmission in the frequency band. The First control unit 131 acquires the frame synchronization information and provides the frame synchronization information to the base stations 200 belonging to the MBSFN area.

The base station 200 adjusts a timing of the radio frame for the frequency band on the basis of the frame synchronization information which is the frame synchronization information for synchronizing radio frames for a frequency band shared by a plurality of radio communication systems (that is, the shared band) and provided by the control entity 100. The second control unit 253 acquires the frame synchronization information and adjusts the timing on the basis of the frame synchronization information.

Further, hereinafter, the timing of the radio frame may also be referred to as a "frame timing."

(a) MBSFN Area

The base stations 200 of the different cellular systems belong to the MBSFN area. For example, the base station 200 of the first cellular system and the base station 200 of the second cellular system different from the first cellular system belong to the MBSFN area.

for example, the base stations 200 of the different operators (for example, the different MNOs) belong to the MBSFN area. For example, the first cellular system is the system of the first operator, and the second cellular system is the system of the second operator different from the first operator. In other words, the base station 200 of the first operator and the base station 200 of the second operator belong to the MBSFN area.

As an example, referring back to FIGS. 11 and 12, the base station 200A of the first cellular system of the first operator and the base station 200B of the second cellular system of the second operator belong to the MBSFN area 40. In this case, the control entity 100 provides the frame synchronization information for synchronizing the radio frame for the frequency band F5 to the base station 200A and/or the base station 200B belonging to the MBSFN area 40.

(b) Shared Band

In other words, the shared band (the frequency band shared by a plurality of radio communication systems) is a frequency band included in the unlicensed band. The unlicensed band is a band which can be used without license.

For example, the unlicensed band is the 5 GHz band. In this case, for example, the shared band is a channel of a wireless LAN. In other words, the shared band is a frequency band which is shared between the cellular system and the wireless LAN or the like. Alternatively, the unlicensed band may be any other band such as the 3.5 GHz band/or the 60 GHz band.

As an example, referring back to FIG. 12, the shared band is the frequency band F5.

For example, the shared band, is used as a component carrier. For example, the shared band is used as a component carrier dedicated to a downlink.

(c) First Example of Frame Synchronization Information (c-1) Frame Synchronization Information For example, the frame synchronization information is information indicating the frame timing for the shared band (that is, the timing of the radio frame). For example, the frame timing is a timing of the beginning of the radio frame for the shared band.

For example, the control entity 100 (the first control unit 131) provides the frame synchronization information to the two or more base stations 200 belonging to the MBSFN area. For example, the control entity 100 (the first control unit 131) provides the frame synchronization information to all the base stations 200 belonging to the MBSFN area (for example, the base station 200A and the base station 200B belonging to the MBSFN area 40).

(c-2) Adjustment Method

For example, the base station 200 (the second control unit 255) matches the frame timing for the shared band in the base station 200 to the frame timing indicated by the frame synchronization information. This point will be described below with reference to FIG. 16 using a specific example.

Figure 16:
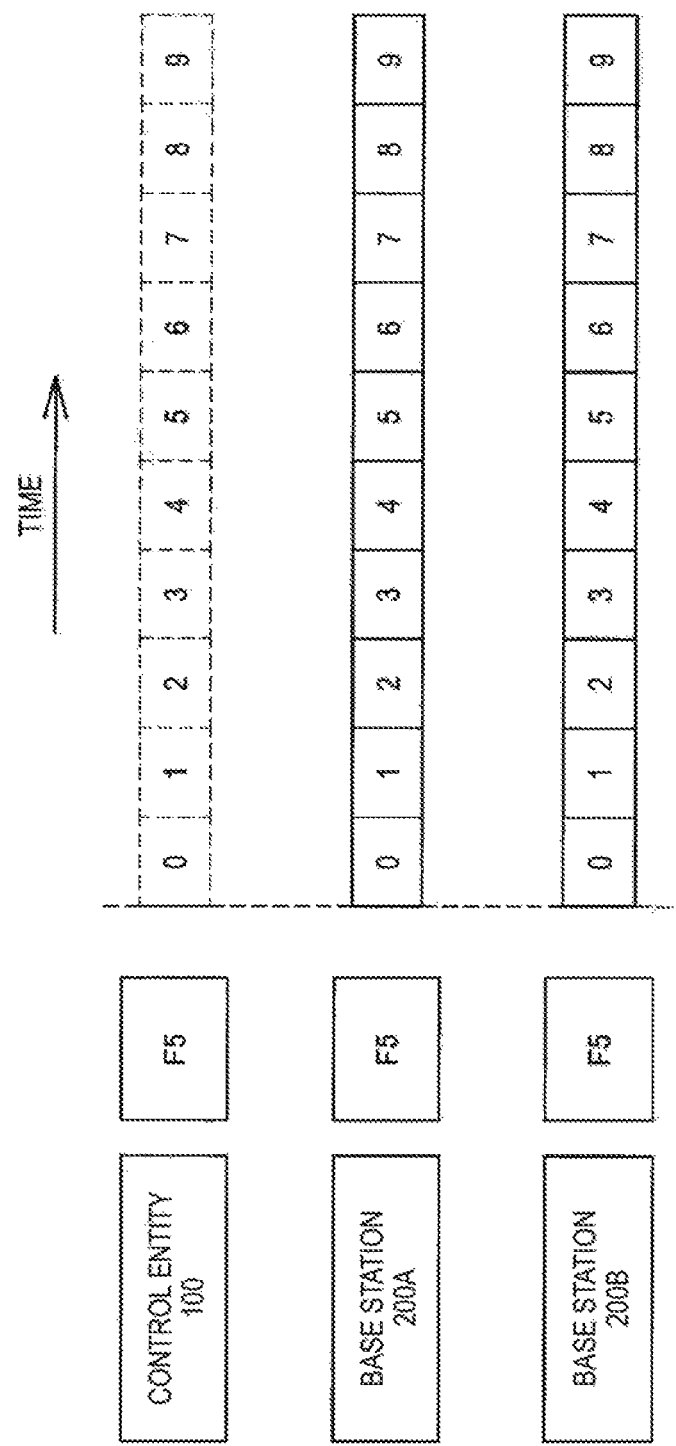
FIG. 16 is an explanatory diagram for describing an example of adjustment of a frame timing by a base station.

FIG. 16 is an explanatory diagram for describing an example of adjustment of the frame timing by the base station 200. Referring to FIG. 16, the control entity 100 holds the frame timing for the frequency band F5 (the shared band). The frame timing is a timing of the beginning of the radio frame. Further, the control entity 100 provides the frame synchronization information indicating the frame timing to the base station 200A and 200B belonging to the MBSFN area 40. The base station 200A matches the frame timing for the frequency band F5 in the base station 200A to the frame timing indicated by the frame synchronization information (the frame timing held in the control entity 100). The base station 200B also matches the frame timing for the frequency band F5 in the base station 200B to the frame timing indicated by the frame synchronization information (that is, the frame timing held in the control entity 100).

Accordingly for example, the frame timing in the shared band is matched between the base stations 200 of the different cellular systems. As a result, the base stations 200 of the different cellular systems can perform the MBSFN transmission in the shared band.

(c-3) Clock Correction

Clock Correction Process

For example the control entity 100 (the first control unit 131) perform a clock correction process with each of the two or more base stations 200. Specifically, for example, the clock correction process is a process according to IEEE 1588. The clock correction process can also be called a clock synchronization process. An example of a clock and an example of a clock correction process will be described below with reference to FIGS. 17 and 18.

Figure 17:
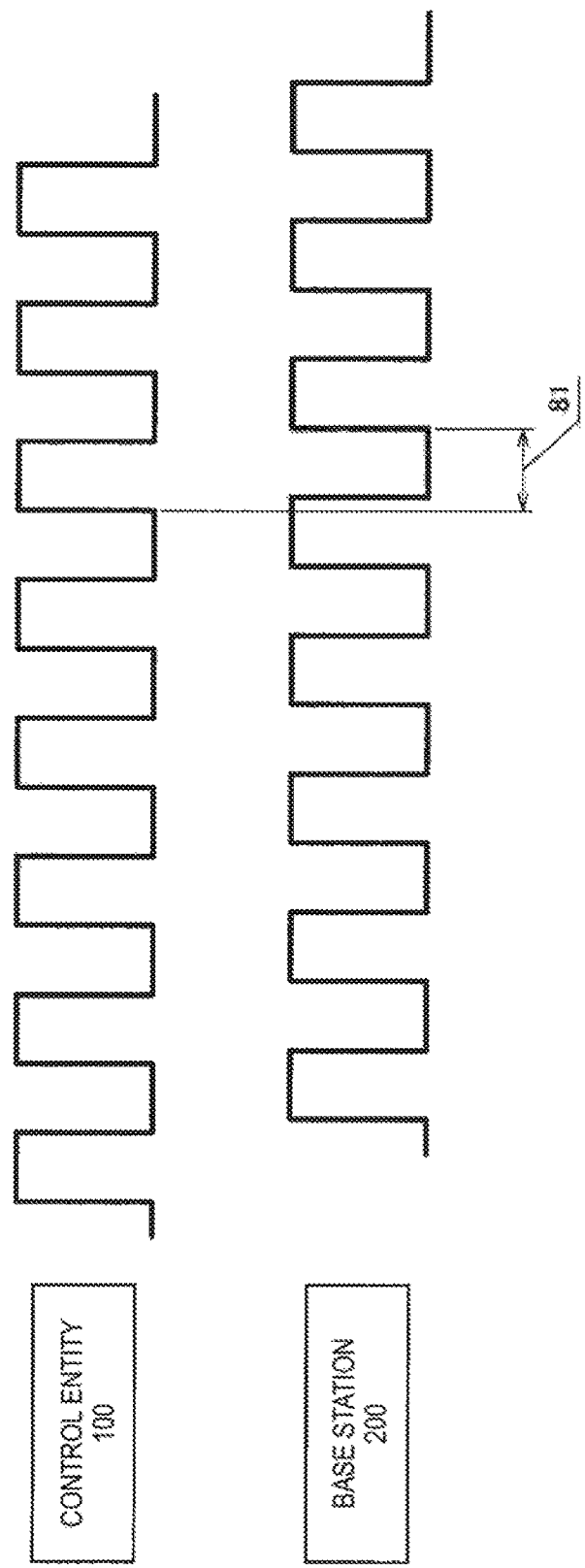
FIG. 17 is an explanatory diagram for describing an example of a clock.

FIG. 17 is an explanatory diagram for describing an example of the clock. Referring to FIG 17, a clock of the control entity 100 and a clock of the base station 200 are illustrated. For example, the clock of the control entity 100 and the clock of the base station 200 differ by a time 81.

Figure 18:
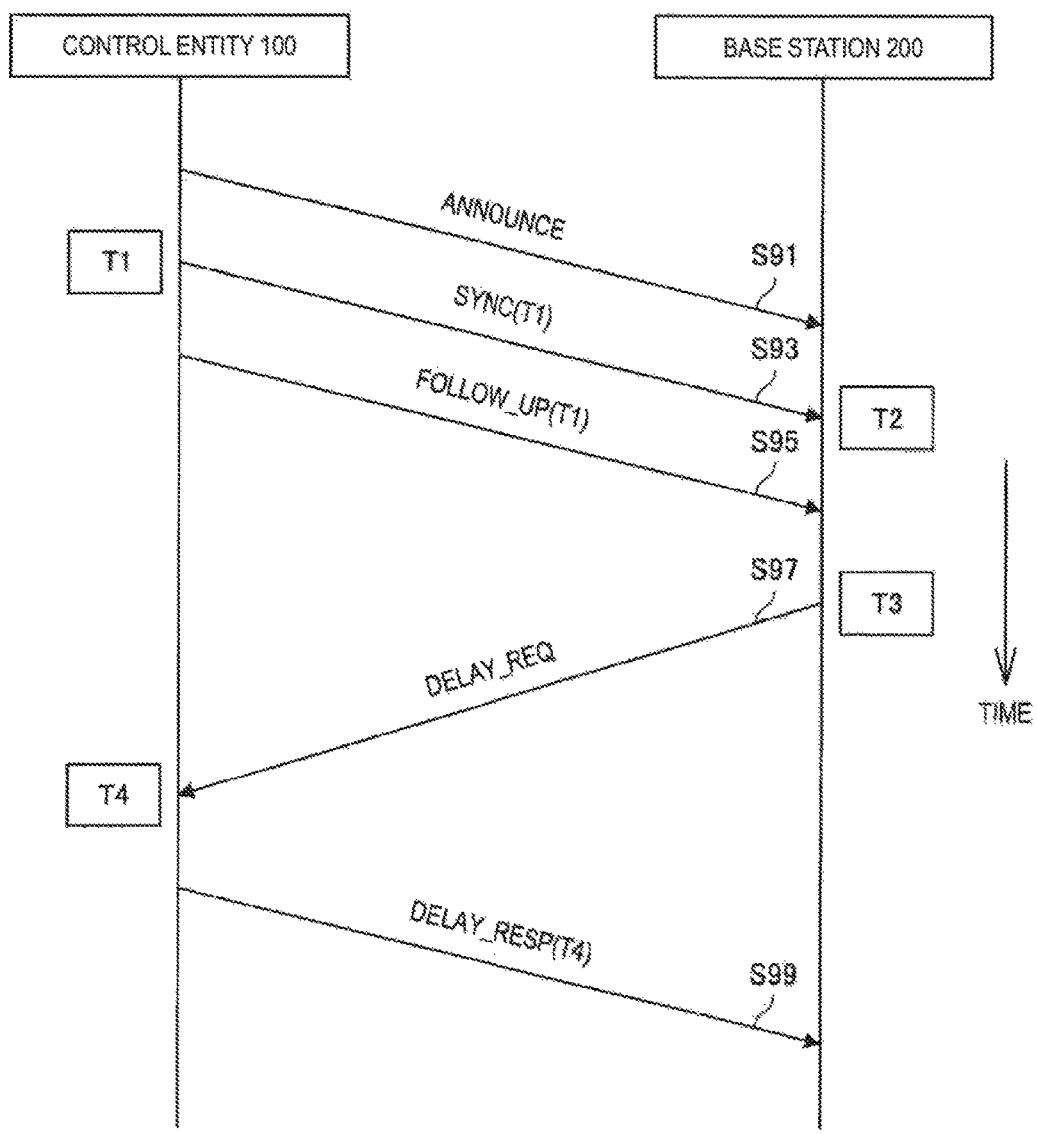
FIG. 18 is an explanatory diagram for describing an example of a clock correction process.

FIG. 18 is an explanatory diagram for describing an example of the clock correction process. The control entity 100 serving as a master transmits an ANNOUNCE message to the base station 200 serving as a slave (S91). Then, the control entity 100 further transmits a SYNC message to the base station 200 at a time T1 (S93), and the base station 200 records a time T2 when the SYNC message arrives at the base station 200. Further, the control entity 100 transmits a FOLLOW_UP message indicating the time T1 to the base station 200 (S95). Thereafter, the base station 200 transmits a DELAY_REQ message at a time T3 (S97) and records the time T3. Then, the control entity 100 transmits a DELAY_RESP message indicating a time T4 when the DELAY_REQ message arrives to the base station 200 (S99). The base station 200 calculates a round-up delay time and a clock offset between the base station 200 and the control entity 100 on the basis of the times T1 to T4. If a one-way delay time is assumed to half the round-trip delay time, the one way delay time is [(t2−t1)+t4−t3)]/2. The clock offset is (t2−t1)−(one way delay). The clock offset corresponds to the time 81 illustrated in FIG. 17. The base station 200 acquires the offset corresponding to the time 81 as a result of the clock correction process. For example, this process is repeated twice or more. Further, this process is repeated periodically.

Adjustment of Frame Timing Based on Result of Clock Correction Process

For example, the base station 200 (the second control unit 253) adjusts the frame timing for the shared band further on the basis of the result of the clock correction process with the control entity 100.

For example, as described above, the result of the clock correction process is the offset corresponding to the time 81. Then, the base station 200 adjusts the frame timing of the shared band on the basis of the frame synchronization information indicating the frame timing for the shared band and the offset. As an example, the base station 200 corrects the frame timing indicated by the frame synchronization information using the offset, and matches the frame timing for the shared band in the base station 200 to the corrected frame timing. As another example, the base station 200 may correct a time maintained in the base station 200 using the offset. Then, the base station 200 may match the frame timing for the shared band in the base station 200 to the frame timing indicated by the frame synchronization information.

Accordingly, for example, the frame timing in the shared band can be more precisely matched between the base stations 200 of the different cellular systems.

(c-4) Use of GPS Time Information

Instead of the clock correction process, the base station 200 (the second control unit 253) may adjust the name timing for the shared band further on the basis of time information obtained from a Global Positioning System (GPS) receiver.

The base station 200 may include the GPS receiver. The GPS receiver may calculate an accurate time by receiving signals from GPS satellites. The base station 200 may correct the time maintained in the base station 200 on the basis of the time information indicating the accurate time. Further, the base station 200 may match the frame timing for the shared band in the base station 200 to the frame timing indicated by the frame synchronization information.

Accordingly, for example, the frame timing is the shared band is more precisely matched between the base stations 200 of the different cellular systems.

(d) Second Example (d-1) Frame Synchronization Information

The frame synchronization information may be information indicating the base station serving as a reference for synchronization (that is, synchronization of the radio frames for the shared band) among the two or more base stations 200 belonging to the MBSFN area for the MBSFN transmission in the shared band.

As an example, referring back to FIG. 11 and FIG. 12, the base station 200B among the base stations belonging to the MBSFN area 40 (that is, the base station 200A and the base station 200B) may be a base station serving as a reference for synchronization of the radio frame for the frequency band F5 (the shared band). In this case, the frame synchronization information may indicate the base station 200B as the base station serving as the reference for the synchronization.

The control entity 100 (the first control unit 131) may provide the frame synchronization information to all the base stations 200 belonging to the MBSFN area (for example, the base station 200A and the base station 200B belonging to the MBSFN area 40). Alternatively, the control entity 100 (the first control unit 131) may provide the frame synchronization information to the base station 200 (for example, the base station 200A) that is not the base station serving as the reference for the synchronization (for example, the base station 200B) among all the base stations 200 belonging to the MBSFN area.

(d-2) Adjustment Method

For example, the base station 200 may not be the base station serving as the reference for the synchronization, and the base station 200 (the second control unit 253) may adjust the frame timing for the shared band using the synchronization signal transmitted in the shared band from the base station serving as the reference for the synchronization.

As an example, referring back to FIGS. 11 and 12, the base station 200A may match the frame timing of the base station 200A in the frequency band F5 to the timing of the radio frame of the base station 200B in the frequency band F5 using the synchronization signal transmitted in the frequency band F5 (the shared band) from the base station 200B serving as the reference for the synchronization. A primary synchronization signal (PSS) and a secondary synchronization signal (SSS) may be used as the synchronization signal.

Accordingly, for example, the frame timing in the shared band is matched between the base stations 200 of the different cellular systems. As a result, the base station 200 of different cellular systems can perform the MBSFN transmission in the shared band.

The base station 200 may be the base station serving as the reference for the synchronization. In this case, the base station 200 (the second control unit 253) may not adjust the frame timing for the shared band.

(e) Provision Timing of Frame Synchronization Information

The control entity 100 may provide the frame synchronization information to the base station 200 when the MBSFN area for the MBSFN transmission in the shared band is allocated to the base station 200 or may periodically provide the frame synchronization information to the base stations 200 belonging to the MBSFN area (2) Synchronization of Frame Timing for Cellular Band Between Base Stations For example, the frame timing for the shared band is different from the frame timing for the cellular band (that is, the frequency band for the cellular system).

As an example, referring back to FIGS. 11 and 12, the base station 200 of the cell 20 (the small cell) matches the frame timing of the base station 200 in the cellular band to the frame timing of the base station 50 of the macro cell 51. On the other hand, the base station 200 of the cell 20 (the small cell) matches the frame timing of the base station 200 in the shared band to the frame timing of the shared band held in the control entity 100 (or the frame timing in the shared band of another base station 200 serving as the reference for synchronization). Thus, the frame timing for the shared band is different from the frame timing for the cellular band. This point will be described below with reference to FIG. 19 using a specific example.

Figure 19:
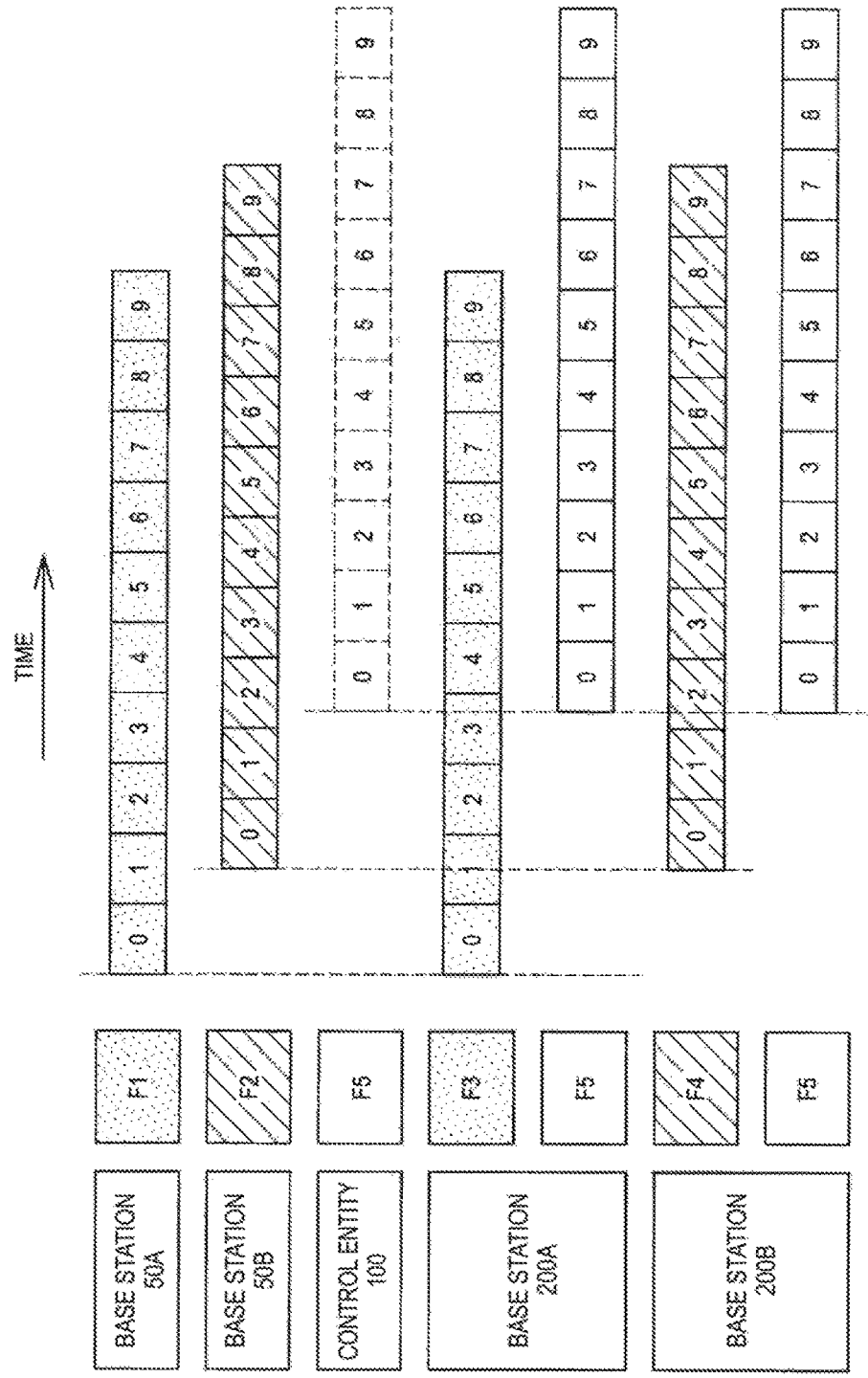
FIG. 19 is an explanatory diagram for describing another example of adjustment of a frame timing by the base station.

FIG. 19 is an explanatory diagram for describing another example of the adjustment of the frame timing by the base station 200. Referring to FIG. 19, similarly to the example of FIG. 16, the base station 200A matches the frame timing for the frequency band F5 in the base station 200A to the frame timing held in the control entity 100. On the other hand, the base station 200A matches the frame timing for the frequency band F3 in the base station 200A to the frame timing for the frequency band F1 in the base station 50A of the macro cell 51A. As described above, in the base station 200A, the frame timing for the frequency band F5 is different from the frame timing for the frequency band F3. Further, the base station 200B matches the frame timing for the frequency band F5 in the base station 200B to the frame timing held in the control entity 100. On the other hand, the base station 200B matches the frame timing for the frequency band F4 in the base station 200B to the frame timing for the frequency band F2 in the base station 50B of the macro cell 51B. As described above, in the base station 200B, the frame timing for the frequency band F5 is different from the frame timing for the frequency band F4.

Further, for example, the base station 200 uses a first offset of the clock to adjust the frame timing of the cellular band, and uses a second offset of the clock to adjust the frame timing for the shared band. This point will be described below with reference to FIG. 20 using a specific example.

Figure 20:
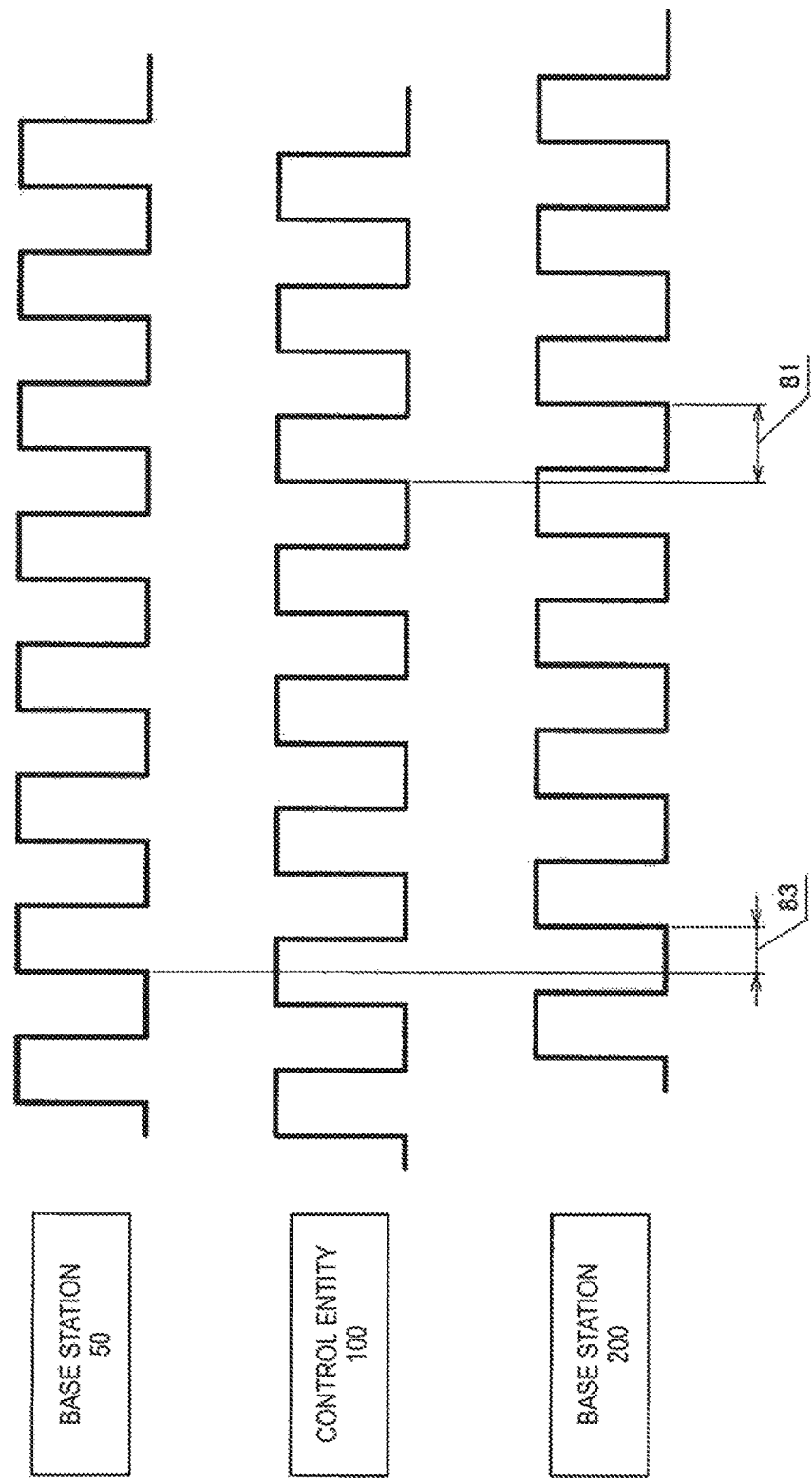
FIG. 20 is an explanatory diagram for describing two offsets of the clock.

FIG. 20 is an explanatory diagram for describing the two offsets of the clock. Referring to FIG. 20, the clock of the base station 50, the clock of the control entity 100, and the clock of the base station 200 are illustrated. The clock of the base station 50 and the clock of the base station 200 differ by a time 83. Therefore, the base station 200 uses a first offset corresponding to the time 83 to adjust the frame tuning of the base station 200 in the cellular band. Further, the clock of the control entity 100 and the clock of the base station 200 differ by the time 81 as described above with reference to FIG. 17. Therefore, the base station 200 uses a second offset corresponding to the time 81 to adjust the frame timing of the base station 200 in the shared band.

(3) Synchronization of Frame Timing of Terminal Device

The terminal device 30 synchronizes the frame timing of the cellular band using the synchronization signal transmitted from the base station 200 in the cellular band. On the other hand, the terminal device 30 synchronizes the frame timing for the shared band using the synchronization signal transmitted from the base station 200 in the shared band. As a result, for example, in the terminal device 30, the frame timing for the cellular band is different from the frame timing for the shared band.

(4) Other Characteristics Related to Frame Timing

For example, the terminal device 30 supports the carrier aggregation, uses the cellular band as a PCC, and uses the shared band as the SCC. Further, as described above, the frame timing of the cellular band (FCC) may be different from the frame timing for the shared band (SCC).

(a) Retransmission Control

For example, the base station 200 transmits downlink data to the terminal device 30 in the shared band, and the terminal device 50 receives the downlink data in the shared band (SCC). Thereafter, the terminal device 30 transmits an ACK/NACK for the downlink data in the cellular band. Particularly, the terminal device 30 transmits an ACK/NACK in accordance with the frame timing for the cellular band (FCC). Therefore, the terminal device 30 transmits the ACK/NACK at a timing different from a case where the frame timing of the SCC is synchronized with the frame tuning of the PCC. This point will be described below with reference to FIG. 21 using a specific example.

Figure 21:
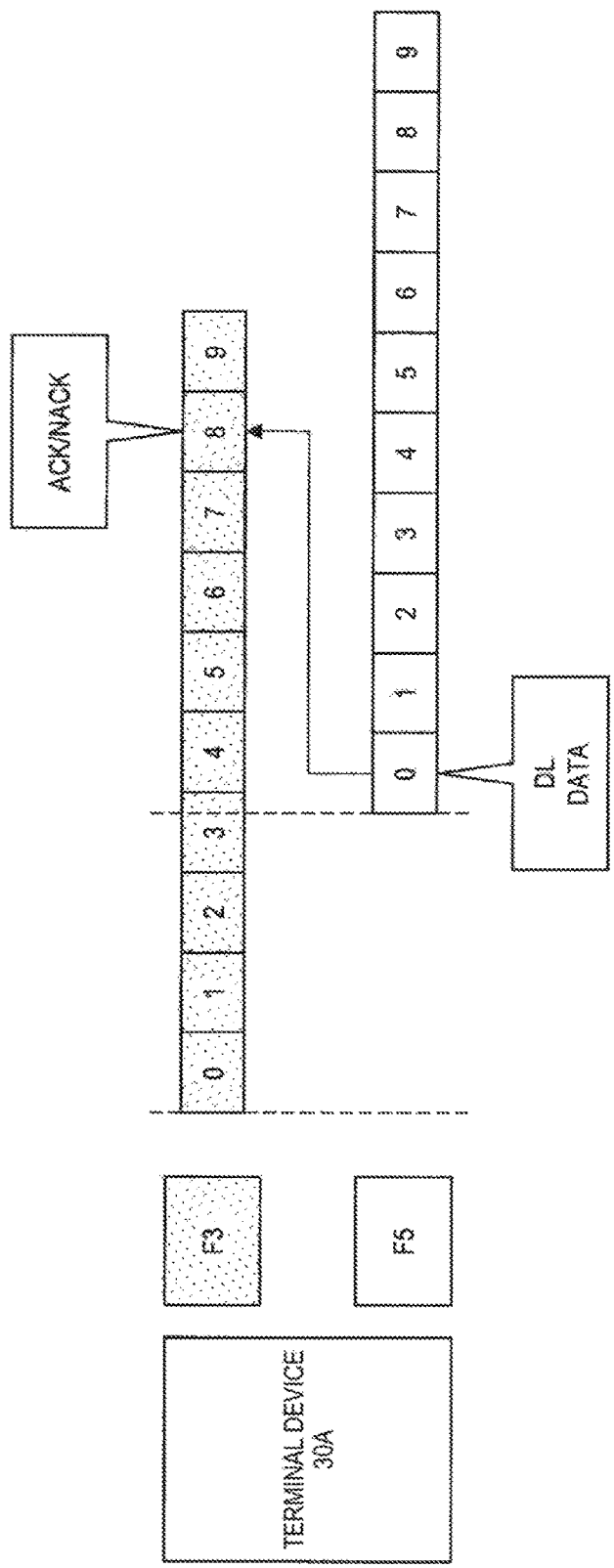
FIG. 21 is an explanatory diagram for describing in example of transmission of ACK/NACK for downlink data transmitted in a shared band.

FIG. 21 is an explanatory diagram for describing an example of transmission of an ACK/NACK for the downlink data transmitted in the shared band. Referring to FIG. 21, the radio frame of the frequency band F3 serving as the cellular band and the radio frame of the frequency band F5 serving as the shared band are illustrated The frame timing of the frequency band F3 and the frame timing of the frequency band F5 are different from each other. In this example, the terminal device 30A uses the frequency band F3 as the PCC and uses the frequency band F5 as the SCC. For example, the terminal device 30A typically transmits an ACK/NACK after four subframes subsequent to a subframe in which the downlink data is transmitted. However, the terminal device 30A transmits an ACK/NACK for the downlink data transmitted in a subframe 0 in the frequency band F5 through a subframe 8 rather than a subframe 4 in the frequency band F3.

(b) Counting

For example, the terminal device 30 receives an MBMS counting request message transmitted from the base station 200 in the shared band (SCC). In a case where the MBMS service which is being received or in which interest is shown is included in a list in the MBMS counting request message the terminal device 30 transmits an MBMS counting response message in the cellular band (PCC). Particularly, the terminal device 30 transmits the MBMS counting response message in accordance with the frame timing for the cellular band (PCC).

<5.3. Flow of Process>

Next, an example of a process according to the first embodiment will be described with reference to FIG. 22. FIG. 22 is a sequence diagram illustrating an example of a schematic flow of a process according to the second embodiment.

The control entity 100 acquires the frame synchronization information for synchronizing the radio frame for the shared band and provides the frame synchronization information to the base stations 200 belonging to the MBSFN area for the MBSFN transmission in the shared band (S431).

The base station 200 acquires the frame synchronization information and adjusts the timing of the radio frame for the shared band on the basis of the frame synchronization information (S433).

Thereafter, the base station 200 performs the MBSFN transmission in the shared band (S435).

The second embodiment has been described above. The second embodiment and the first embodiment may be combined. For example, the operation of the control entity 100 according to the second embodiment may further include the operation of the control entity 100 according to the first embodiment. For example, the operation of the base station 200 according to the second embodiment may further include the operation of the base station 200 according to the first embodiment.

«6. Application Examples»

The technology of the present disclosure is applicable to various products. For example, a control entity 100 may be realized as any type of server such as a tower server, a rack server, and a blade server. At least a part of constituent elements of the control entity 100 may be realized in a module (such as an integrated circuit module including a single die, and a card or a blade that is inserted into a slot of a blade server) mounted on a server.

Also, for example, the base station 200 may be implemented as any one type of evolved Node B (eNB) such as a macro eNB or a small eNB. The small eNB may be an eNB that covers a cell smaller than the macro cell such as a pico eNB, a micro eNB or a home (femto) eNB. Instead, the base station 200 may be realized as any other types of base stations such as a NodeB and a base transceiver station (BTS). The base station 200 may include a main body (that is also referred to as a base station apparatus) configured to control radio communication, and one or more remote radio heads (RRH) disposed in a different place from the main body. Additionally, various types of terminals to be described later may also operate as the base station 200 by temporarily or semi-permanently executing a base station function. Further, at least some components of the base station 200 may be implemented in a base station apparatus of a module for a base station apparatus.

<6.1. Application Example Regarding Control Entity>

Figure 23:
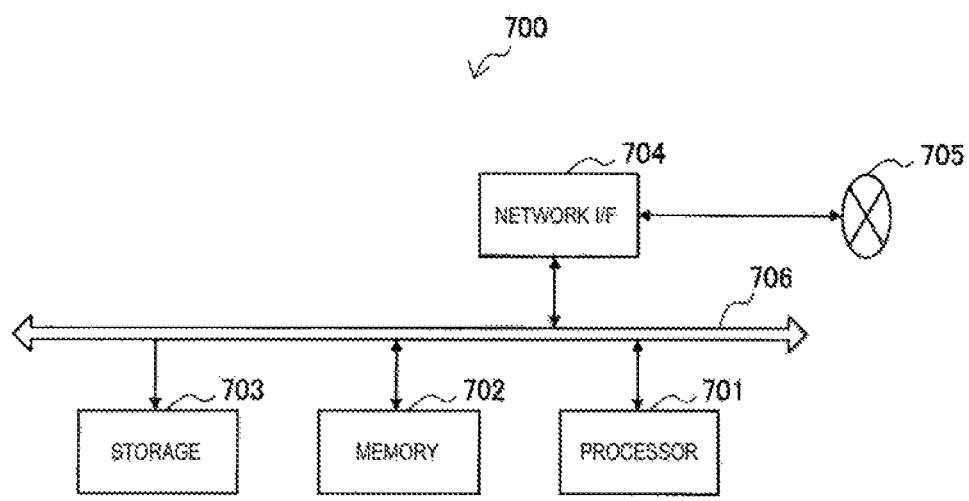
FIG. 23 is a block diagram illustrating an example of a schematic configuration of a server.

FIG. 23 is a block diagram illustrating an example of a schematic configuration of a server 700 to which the technology of the present disclosure may be applied. The server 700 includes a processor 701 a memory 702, a storage 703, a network interface 704, and a bus 706.

The processor 701 may be, for example, a central processing unit (CPU) or a digital signal processor (DSP) and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 700 may include two or more buses (such as a high speed bus and a low speed bus) each of which has different speed.

In the server 700 illustrated in FIG. 23, the first control unit 131 and/or the second control unit 133 described with reference to FIG. 13 may be implemented in the processor 701. As one example, a program causing the processor to function as the first control unit 131 and/or the second control unit 133 (in other words, a program causing the processor to perform the operations of the first control unit 131 and/or the second control unit 133) may be installed in the server 700 so that the processor 701 can execute the program. As another example, in the server 700, a module including the processor 701 and the memory 702 may be mounted and the first control unit 131 and/or the second control unit 133 may be implemented in the module. In this case, the module may store a program causing the processor to function as the first control unit 131 and/or the second control unit 133 in the memory 702 and the processor 701 may execute the program. As described above, the server 700 or the module may be provided as an apparatus including the first control unit 131 and/or the second control unit 133 or the program causing the processor to function as the first control unit 131 and/or the second control unit 133 may be provided. A readable recording medium having the program recorded thereon may be provided.

<6.2. Application Examples Regarding Base Station>

(1) First Application Example

Figure 24:
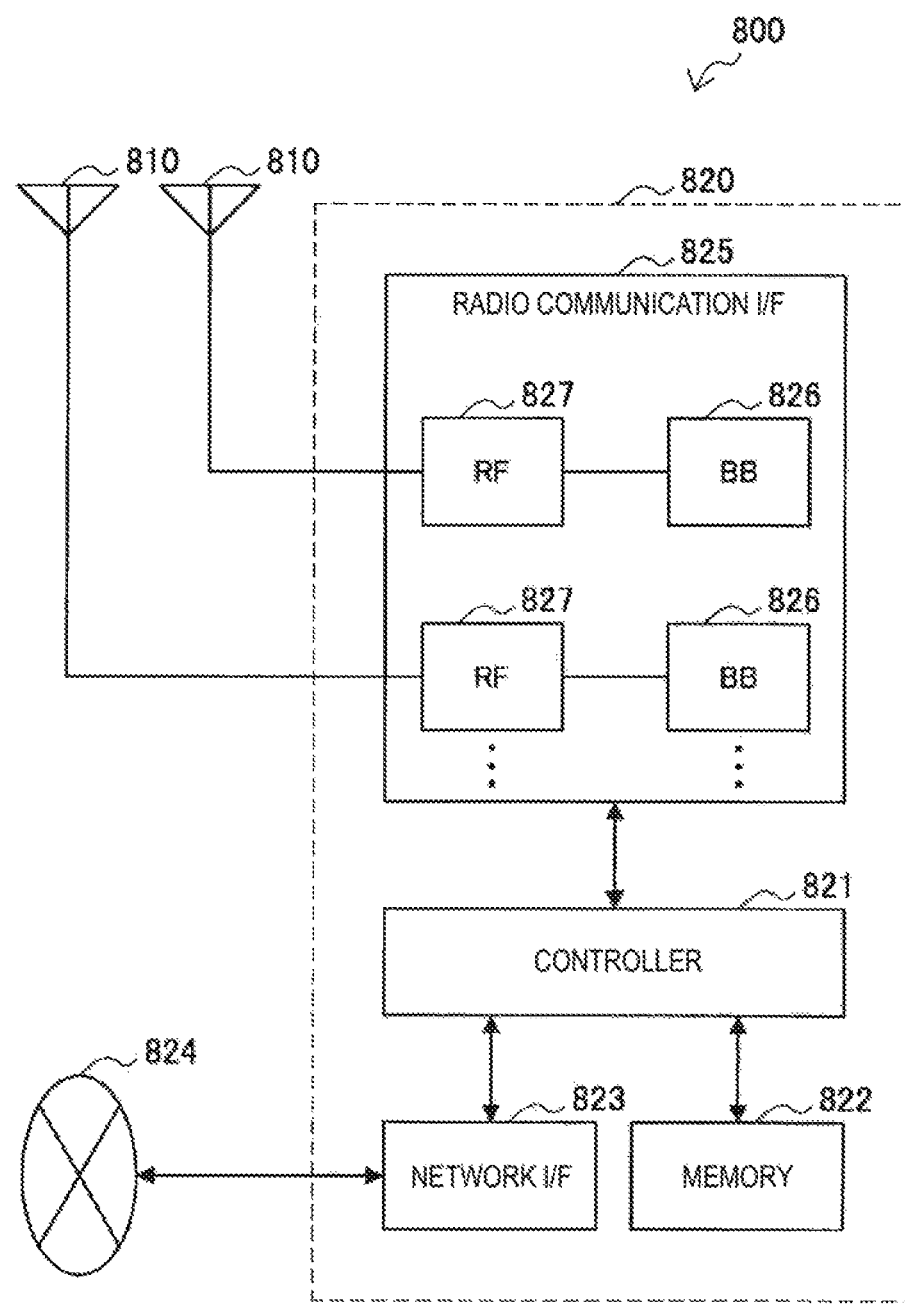
FIG. 24 is a block diagram illustrating a first example of a schematic configuration of an eNB.

FIG. 24 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 24. For example, the multiple antennas 810 may be compatible with respective multiple frequency bands used by the eNB 800. Although FIG. 24 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be for example, a CPU or a DSP, and operates various functions of a higher layer of the base station apparatus 820. For example, the controller 821 generates a data packet from data in signals processed by the radio communication interface 825, and transfers the generated packet via the network interface 825. The controller 821 may bundle data from multiple base band processors to generate the bundled packet, and transfer the generated bundled packet. The controller 821 may have logical functions of performing control such as radio resource control, radio bearer control mobility management, admission control, and scheduling. The control may be performed in cooperation with an eNB or a core network node in the vicinity. The memory 822 includes RAM and ROM, find stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node to the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Lone Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 24. For example, the multiple BB processors 826 may be compatible with respective multiple frequency bands used by the eNB 800. The radio communication interface 825 may include the multiple RF circuits 827, as illustrated in FIG. 24. For example, the multiple RF circuits 827 may be compatible with respective multiple antenna elements. Although FIG. 24 illustrates the example in which the radio communication interface 825 includes the multiple BB processors 826 and the multiple RF circuits 827, the radio communication interface 825 may also include a single BB processor 826 or a single RF circuit 827.

Figure 14:
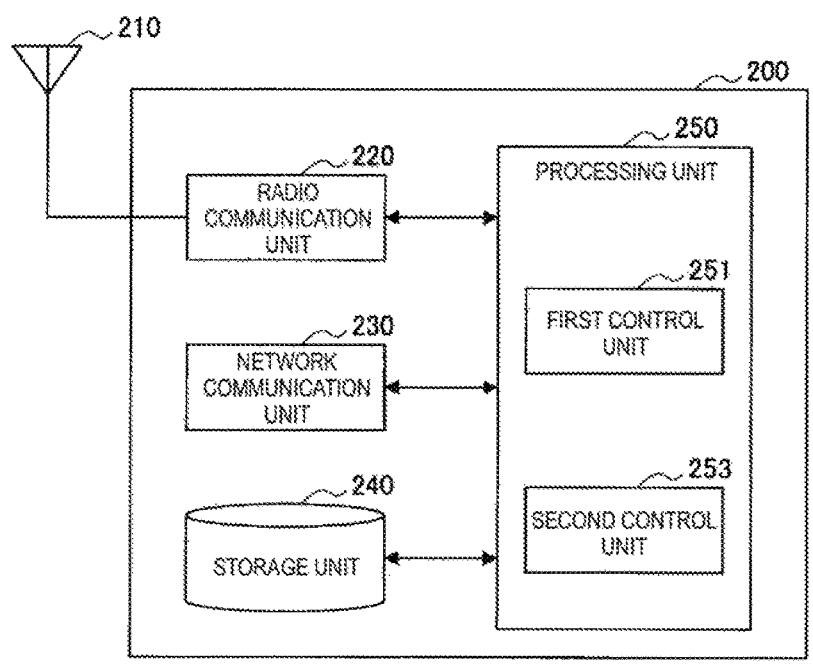
FIG. 14 is a block diagram illustrating an example of a configuration of a base station according to the embodiment.

In the eNB 800 illustrated in FIG. 24, the first control unit 251 and/or the second control unit 253 described with interference to FIG. 14 may be implemented in the radio communication interface 825. Alternatively, at least a part of constituent elements may be implemented in the controller 821. As one example, in the eNB 800, a module including a part (for example, the BB processor 826) or all of the radio communication interface 825 and/or the controller 821 may be mounted, and the first control unit 251 and/or the second control unit 253 may be implemented in the module. In this case, the module may store a program causing the processes to function as the first control unit 251 and/or the second control unit 253 (in other words, a program causing the processor to perform the operations of the first control unit 251 and/or the second control unit 255) and may execute the program. As another example, a program causing the processor to function as the first control unit 251 and in the second control unit 253 may be installed in the eNB 800, and the radio communication interface 825 (for example, the BB processor 826) and/or the controller 821 may execute the program. As described above the eNB 800, the base station apparatus 820, or the module may be provided as an apparatus including the first control unit 251 and/or the second control unit 253, or a program causing the processor to function as the first control unit 251 and/or the second control unit 253 may be provided. A readable recording medium having the program recorded thereon may be provided.

Also, in the eNB 800 shown in FIG. 24, the radio communication unit 220 described above with reference to FIG. 14 may be implemented in the radio communication interface 825 (for example, the RF circuit 827). Further, the antenna unit 210 may be implemented in the antenna 810. Furthermore, the network communication unit 230 may be implemented in the controller 821 and/or the network interface 823.

(2) Second Application Example

Figure 25:
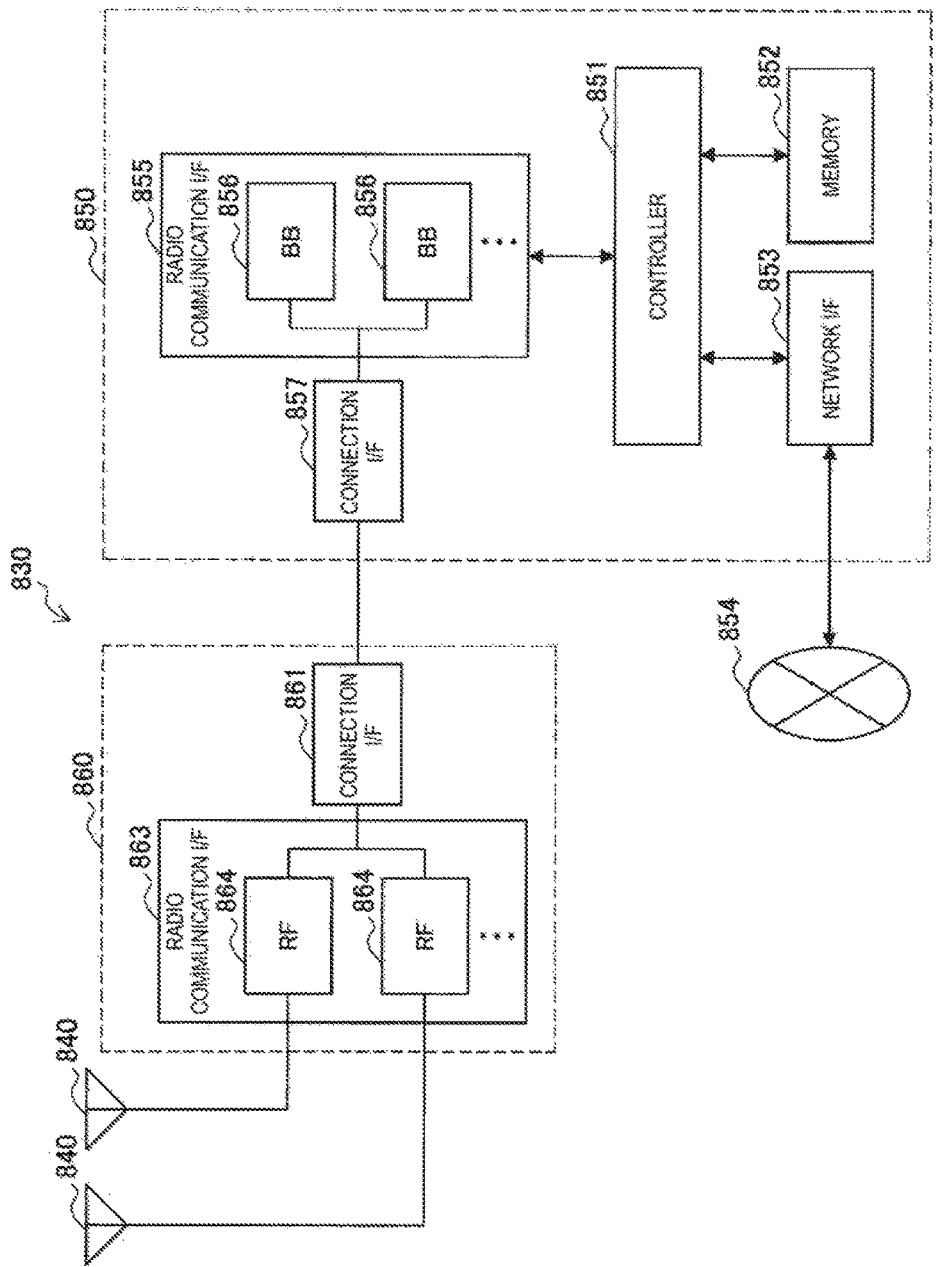
FIG. 25 is a block diagram illustrating a second example of a schematic configuration of the eNB.

FIG. 25 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 25. For example, the multiple antennas 840 may be compatible with respective multiple frequency bands used by the eNB 830. Although FIG. 25 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are similar to the controller 821, the memory 822, and the network interface 823 described with reference to FIG. 24.

The radio communication interface supports any cellular communication scheme such as LTE and LTE-Advanced, and provides radio connection to a terminal positioned in a sector corresponding to the RRH 860 via the RRH 860 and the antenna 840. The radio communication interface 855 may typically include, for example, a BB processor 856. The BB processor 856 is similar to the BB processor 826 described with reference to FIG. 24, except the BB processor 856 is connected to the RF circuit 864 of the RRH 860 via the connection interface 857. The radio communication interface 855 may include the multiple BB processors 856, as illustrated in FIG. 25. For example, the multiple BB processors 856 may be compatible with respective multiple frequency bands used by the eNB 830. Although FIG. 25 illustrates the example in which the radio communication interface 855 includes the multiple BB processors 856, the radio communication interface 855 may also include a single BB processor 850.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 25. For example, the multiple RF circuits 864 may be compatible with respective multiple antenna elements. Although FIG. 25 illustrates the example in which the radio communication interface 863 includes the multiple RF on cutis 864, the radio communication interface 863 may also include a single RF circuit 864.

In the eNB 830 illustrated in FIG. 25, the first control unit 251 and/or the second control unit 253 described with reference to FIG. 14 may be implemented in the radio communication interface 855 and/or the radio communication interface 863. Alternatively, at least a part of constituent elements may be implemented in the controller 851. As one example, in the eNB 830, a module including a part (for example, the BB processor 856) or all of the radio communication interface 855 and/or the controller 851 may be mounted, and the first control unit 251 and/or the second control unit 253 may be implemented in the module. In this case, the module may store a program causing the processor to function as the first control unit 251 and/or the second control unit 253 (in other words, a program causing the processor to perform the operations of the first control unit 251 and/or the second control unit 253) and may execute the program. As another example, a program causing the processor to function as the first control unit 251 and/or the second control unit 253 may be installed in the eNB 830, and the radio communication interface 855 (for example, the BB processor 856) and/or the controller 851 may execute the program. As described above, the eNB 830, the base station apparatus 850, or the module may be provided as an apparatus including the first control unit 251 and/or the second control unit 253, or a program causing the processor to function as the first control unit 251 and/or the second control unit 253 may be provided. A readable recording medium having the program recorded thereon may be provided.

Also, in the eNB 830 shown in FIG. 25, for example, the radio communication unit 220 described with reference to FIG. 14 may be implemented in the radio communication interface 863 (for example, the RF circuit 864). Further, the antenna unit 210 may be implemented in the antenna 840.

Furthermore, the network communication unit 230 may be implemented in the controller 851 and/or the network interface 853.

«7. Conclusion»

The apparatuses and the processes according to the embodiments of the present disclosure have been described above with reference to FIGS. 10 to 25.

(1) First Embodiment

According to the first embodiment, the control entity 100 includes the first control unit 131 that acquires the scheduling information of the MBSFN transmission in the frequency band shared by a plurality of radio communication systems and provides the scheduling information to the two or more base stations 200 belonging to the MBSFN area for that MBSFN transmission.

According to the first embodiment, the base station 200 includes the first control unit 251 that requests the control entity 100 to allocate the MBSFN area to the base station 200 and the second control unit 253 that acquires the scheduling information which is scheduling information for the MBSFN transmission in the frequency band shared by a plurality of radio communication systems and provided from the control entity 100 to the base station 200 and controls the MBSFN transmission in the frequency band by the base station 200 in accordance with the scheduling information.

Thus, for example, it is possible to provide the service of the MBSFN using the frequency band shared by a plurality of radio communication systems.

(2) Second Embodiment

According to the second embodiment the control entity 100 includes the first control unit 131 that acquires the frame synchronization information for synchronizing the radio frame for the frequency band shared by a plurality of radio communication systems and provides the frame synchronization information to the base stations 200 belonging to the MBSFN area for the MBSFN transmission in the frequency band. The base stations 200 of the different cellular systems belong to the MBSFN area.

According to the second embodiment, the base station 200 includes the second control unit 253 that acquires the frame synchronization information which is frame synchronization information for synchronizing the radio frame for the frequency band shared by a plurality of radio communication systems and provided from the control entity 100 and adjusts the timing of the radio frame for the frequency band on the basis of the frame synchronization information.

Accordingly, for example, the base stations of the different cellular systems can perform the MBSFN transmission in the frequency band shared by a plurality of radio communication systems.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the control entity (that is, the control entity according to the second embodiment) that provides the frame synchronization information for synchronizing the radio frame for the shared band may be all entity different from the control entity that provides the scheduling information of the MBSFN transmission in the shared band (that is, the control entity according to the first embodiment). For example, the control entity that provides the frame synchronization information may be an entity other than an MCE.

For example, the example in which the cellular system is a system that conforms to LTE, LTE-Advanced, or a communication standard equivalent thereto has been described, but the present disclosure is not limned thereto. For example, the communication system may be a system that conforms to another communication standard.

The processing steps in the processes of the present specification may not necessarily be performed chronologically in the orders described in the flowcharts or the sequence diagrams. For example, the processing steps in the processes may be performed in different orders from the orders described in the flowcharts or the sequence diagrams or may be performed in parallel.

It is also possible to create a computer program causing a processor (for example, a CPU, a DSP, or the like) installed in the apparatus of this specification (for example, the control entity, or a module for the control entity, the base station, the base station apparatus, or a module for the base station apparatus) to function as the components of the apparatus (for example, the first control unit and/or the second control unit) (that is, a computer program causing the processor to execute the operations of the components of the apparatus). A recording medium having the computer program recorded thereon may also be provided, further, an apparatus including a memory that stores the computer program and one or more processors capable of executing the computer program (for example, the control entity, or the module for the control entity, the base station, the base station apparatus, or the module for the base station apparatus) may be provided. Further, a method including the operations of the components of the apparatus (for example, the first control unit and/or the second control unit) is also included in technology according to the present disclosure.

Further the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An apparatus, including:
a first control unit configured to acquire scheduling information for multimedia broadcast multicast services (MBMS) over single frequency network (MBSFN) transmission in a frequency band shared by a plurality of radio communication systems and provide the scheduling information to two or more base stations belonging to an MBSFN area for the MBSFN transmission.

(2)
The apparatus according to (1), further including:
a second control unit configured to allocate the MBSFN area to a base station.

(3)
The apparatus according to (2),
wherein the second control unit allocates the MBSFN area to the base station in response to a request from the base station.

(4)
The apparatus according to (2) or (3),
wherein the second control unit allocates the MBSFN area to the base station on the basis of a position of the base station, a neighboring cell of the base station, or a measurement result for the neighboring cell by the base station.

(5)
The apparatus according to any one of (2) to (4),
wherein the second control unit allocates the MBSFN area to the base station on the basis of a desired service of the base station.

(6)
The apparatus according to any one of (2) to (5),
wherein the second control unit allocates the MBSFN area to the base station on the basis of a frequency band available to the base station.

(7)
The apparatus according to any one of (2) to (6),
wherein the second control unit allocates the MBSFN area to the base station oil the basis of an MBSFN area detected by the base station or a measurement result for the MBSFN area by the base station.

(8)
The apparatus according to any one off (1) to (7),
wherein the scheduling information includes information indicating an MBSFN subframe and information indicating a configuration of a physical multicast channel (PMCH).

(9)
The apparatus according to any one of (1) to (8),
wherein the two or more base stations include base stations of different cellular systems.

(10)
The apparatus according to any one of (1) to (9),
wherein the first control unit acquires frame synchronization information for synchronizing a radio frame for the frequency band and provides the frame synchronizing information to the base stations belonging to the MBSFN area and
base stations of different cellular systems belong to the MBSFN area.

(11)
The apparatus according to (10),
wherein the frame synchronization information is information indicating a timing of the radio frame for the frequency band, and
the first control unit provides the frame synchronization information to the two or more base stations belonging to the MBSFN area.

(12)
The apparatus according to (11),
wherein the first control unit performs a clock correction process with each of the two or more base stations.

(13)
The apparatus according to (10),
wherein the frame synchronization information is information indicating a base station serving as a reference for the synchronization among the two or more base stations belonging to the MBSFN area.

(14)
An apparatus, including:
a first control unit configured to request a control entity to allocate an MBSFN area to a base station, and
a second control unit configured to acquire scheduling information which is scheduling information for MBSFN transmission in a frequency band shared by a plurality of radio communication systems and provided from the control entity to the base station and control the MBSFN transmission in the frequency band by the base station in accordance with the scheduling information.

(15)
The apparatus according to (14),
wherein the first control unit notifies the control entity of a position of the base station, a neighboring cell of the base station, a measurement result for the neighboring cell by the base station, a desired service of the base station, a frequency band available to the base station, an MBSFN area detected by the base station, or a measurement result for the MBSFN area by the base station.

(16)

The apparatus according to (14) or (15), wherein the second control unit issues a notification of a subframe in which the base station does not use the frequency band.

(17)

The apparatus according to any one of (14) to (16), wherein the second control unit acquires frame synchronization information which is frame synchronization information for synchronizing a radio frame for the frequency band and provided from the control entity, and adjusts a timing of the radio frame for the frequency band on the basis of the frame synchronization information.

(18)

The apparatus according to (17), wherein the frame synchronization information is information indicating the timing of the radio frame for the frequency band.

(19)

The apparatus according (18), wherein the second controller adjusts the timing of the radio frame for the frequency band further on the basis of a result of a clock correction process with the control entity.

(20)

The apparatus according to (19), wherein the second control unit adjusts the timing of the radio frame for the frequency band further on the basis of time information obtained from a Global Positioning System (GPS) receiver.

(21)

The apparatus according to (17), wherein the frame synchronization information is information indicating a base station serving as a reference for the synchronization among two or more base stations belonging to an MBSFN area for the MBSFN transmission in the frequency band, and the second control unit adjusts the timing of the radio frame for the frequency band using a synchronization signal transmitted in the frequency band from the base station serving as the reference for the synchronization.

(22)

The apparatus according to any one of (14) to (21), wherein the timing of the radio frame for the frequency band is different from a timing of a radio frame for a frequency band for a cellular system including the base station.

(23)

A method, including:

acquiring, by a processor, scheduling information for multimedia broadcast multicast services (MBMS) over single frequency network (MBSFN) transmission in a frequency band shared by a plurality of radio communication systems and providing, by the processor, the scheduling information to two of more base stations belonging to an MBSFN area for the MBSFN transmission.

(24)

A program causing a processor to execute:

acquiring scheduling information for multimedia broadcast multicast services (MBMS) over single frequency network (MBSFN) transmission in a frequency band shared by a plurality of radio communication systems; and providing the scheduling information to two or more base stations belonging to an MBSFN area for the MBSFN transmission.

(25)

A readable recording medium having a program recorded thereon, the program causing a processor to execute:

acquiring scheduling information for multimedia broadcast multicast services (MBMS) over single frequency network (MBSFN) transmission in a frequency band shared by a plurality of radio communication systems; and providing the scheduling information to two or more base stations belonging to an MBSFN area for the MBSFN transmission.

(26)

A method, including:

requesting, by a processor, a control entity to allocate an MBSFN area to a base station;

acquiring, by the processor, scheduling information which is scheduling information for MBSFN transmission in a frequency band shared by a plurality of radio communication systems and provided from the control entity to the base station; and controlling, by the processor, the MBSFN transmission in the frequency band by the base station in accordance with the scheduling information.

(27)

A program causing a processor to execute:

requesting a control entity to allocate an MBSFN area to a base station;

acquiring scheduling information which is scheduling information for MBSFN transmission in a frequency band shared by a plurality of radio communication systems and provided from the control entity to the base station; and controlling the MBSFN transmission in the frequency band by the base station in accordance with the scheduling information.

(28)

A readable recording medium having a program recorded thereon, the program causing, a processor to execute:

requesting a control entity to allocate an MBSFN area to a base station;

acquiring scheduling information which is scheduling information for MBSFN transmission in a frequency band shared by a plurality of radio communication systems and provided from the control entity to the base station, and controlling the MBSFN transmission in the frequency band by the base station in accordance with the scheduling information.

(29)

An apparatus, including:

a first control unit configured to acquire frame synchronization information for synchronizing a radio frame for a frequency band shared by a plurality of radio communication systems and provide the frame synchronization information to base stations belonging to an MBSFN area for MBSFN transmission in the frequency band, wherein base stations of different cellular systems belong to the MBSFN area.

(30)

A method, including:

acquiring, by a processor, frame synchronization information for synchronizing a radio frame for a frequency band, shared by a plurality of radio communication systems; and providing, by the processor, the frame synchronization information to base stations belonging to an MBSFN area for MBSFN transmission in the frequency band, wherein base stations of different cellular systems belong to the MBSFN area.

(31)

A program causing a processor to execute:

acquiring frame synchronization information for synchronizing a radio frame for a frequency band shared by a plurality of radio communication systems; and providing the frame synchronization information to base stations belonging to an MBSFN area for MBSFN transmission in the frequency band, wherein base stations of different cellular systems belong to the MBSFN area.

(32)

A readable recording medium having a program recorded thereon, the program causing a processor to execute:

acquiring frame synchronization information for synchronizing a radio frame for a frequency band shared by a plurality of radio communication systems, and providing the frame synchronization information to base stations belonging to an MBSFN area for MBSFN transmission in the frequency band, wherein base stations of different cellular systems belong to the MBSFN area.

(33)

An apparatus, including:

a second control unit configured to acquire frame synchronization information which is frame synchronization information for synchronizing a radio frame for a frequency band shared by a plurality of radio communication systems and is provided by a control entity and adjust a timing of the radio frame for the frequency band on the basis of the frame synchronization information.

(34)

A method, including:

acquiring, by a processor, frame synchronization information which is frame synchronization information for synchronizing a radio frame for a frequency band shared by a plurality of radio communication systems and is provided by a control entity; and adjusting, by the processor, a timing of the radio frame for the frequency band on the basis of the frame synchronization information.

(35)

A program causing a processor to execute:

acquiring frame synchronization information which is frame synchronization information for synchronizing a radio frame for a frequency band shared by a plurality of radio communication systems and is provided by a control entity; and adjusting a timing of the radio frame for the frequency band on the basis of the frame synchronization information.

(36)

A readable recording medium having a program recorded thereon, the program causing a processor to execute:

acquiring frame synchronization information which is frame synchronization information for synchronizing a radio frame for a frequency band shared by a plurality of radio communication systems and is provided by a control entity; and adjusting a timing of the radio frame for the frequency band on the basis of the frame synchronization information.

(37)

The apparatus according to any one of (14) to (21), wherein the apparatus is a base station, a base station apparatus for the base station, or a module for the base station apparatus.

REFERENCE SIGNS LIST 1 system
20 cell
30 terminal device
40 MBSFN area
50 base station
51 macro cell
100 control entity
131 first control unit
133 second control unit
200 base station
251 first control unit
253 second control unit

The invention claimed is:

1. An apparatus, comprising:
circuitry including at least a processor and a memory, the circuitry configured to:
acquire scheduling information for multimedia broadcast multicast services (MBMS) over single frequency network (MBSFN) transmission in a frequency band shared by a plurality of radio communication systems; and
provide the scheduling information to two or more base stations belonging to an MBSFN area for the MBSFN transmission,
wherein the two or more base stations are each connected to a different core network, the circuitry is further configured to acquire frame synchronization information for synchronizing a radio frame for the frequency band and provide the frame synchronization information to the two or more base stations belonging to the MBSFN area, base stations of different cellular systems belong to the MBSFN area, the frame synchronization information includes information indicating a timing of the radio frame for the frequency band, and the circuitry is further configured to provide the frame synchronization information to the two or more base stations belonging to the MBSFN area.

2. The apparatus according to claim 1, wherein the circuitry is further configured to allocate the MBSFN area to a base station.

3. The apparatus according to claim 2, wherein the circuitry is further configured to allocate the MBSFN area to the base station in response to a request from the base station.

4. The apparatus according to claim 2, wherein the circuitry is further configured to allocate the MBSFN area to the base station on a basis of a position of the base station, a neighboring cell of the base station, or a measurement result for the neighboring cell by the base station.

5. The apparatus according to claim 2, wherein the circuitry is further configured to allocate the MBSFN area to the base station based on a frequency band available to the base station.

6. The apparatus according to claim 2, wherein the circuitry is further configured to allocate the MBSFN area to the base station based on an MBSFN area detected by the base station or a measurement result for the MBSFN area by the base station.

7. The apparatus according to claim 1, wherein the scheduling information includes information indicating an MBSFN subframe and information indicating a configuration of a physical multicast channel (PMCH).

8. The apparatus according to claim 1, wherein the circuitry is further configured to perform a clock correction process with each of the two or more base stations.

9. The apparatus according to claim 1, wherein the frame synchronization information includes information indicating a base station serving as a reference for a synchronization among the two or more base stations belonging to the MBSFN area.

10. An apparatus, comprising:
   circuitry including at least a processor and a memory, the circuitry configured to:
   request a controller to allocate a multimedia broadcast multicast services (MBMS) over single frequency network (MBSFN) area to a base station;
   acquire scheduling information which is scheduling information for MBSFN transmission in a frequency band shared by a plurality of radio communication systems and provided from the controller to the base station and at least another base station, the base station and the at least another base station belonging to the MBSFN area, and the base station and the at least another base station are each connected to a different core network; and
   control the MBSFN transmission in the frequency band by the base station in accordance with the scheduling information,
   the circuitry is further configured to acquire frame synchronization information for synchronizing a radio frame for the frequency band and provide the frame synchronization information to the two or more base stations belonging to the MBSFN area, base stations of different cellular systems belong to the MBSFN area, the frame synchronization information includes information indicating a timing of the radio frame for the frequency band, and the circuitry is further configured to provide the frame synchronization information to the two or more base stations belonging to the MBSFN area.

11. The apparatus according to claim 10, wherein the circuitry is further configured to notify the controller of a position of the base station, a neighboring cell of the base station, a measurement result for the neighboring cell by the base station, a desired service of the base station, a frequency band available to the base station, an MBSFN area detected by the base station, or a measurement result for the MBSFN area by the base station.

12. The apparatus according to claim 10, wherein the circuitry is further configured to issue a notification of a subframe in which the base station does not use the frequency band.

13. The apparatus according to claim 10, wherein the circuitry is further configured to adjust a timing of the radio frame for the frequency band based on the frame synchronization information.

14. The apparatus according to claim 13, wherein the frame synchronization information includes information indicating a base station serving as a reference for a synchronization among two or more base stations belonging to an MBSFN area for the MBSFN transmission in the frequency band, the circuitry is further configured to adjust the timing of the radio frame for the frequency band using a synchronization signal transmitted in the frequency band from the base station serving as the reference for the synchronization.

15. The apparatus according to claim 10, wherein the circuitry is further configured to adjust the timing of the radio frame for the frequency band further based on a result of a clock correction process with the controller.

16. The apparatus according to claim 10, wherein a timing of a radio frame for the frequency band is different from a timing of a radio frame for a frequency band for a cellular system including the base station.

* * * * *